(12) United States Patent
Takahashi et al.

(10) Patent No.: US 8,437,016 B2
(45) Date of Patent: May 7, 2013

(54) FLOW IMPLEMENTATION SYSTEM, FLOW IMPLEMENTATION METHOD, RECORDING MEDIUM HAVING FLOW IMPLEMENTATION PROGRAM STORED THEREIN, AND IMAGE PROCESSING APPARATUS

(75) Inventors: Hisanori Takahashi, Chiba (JP); Tatsuo Ito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1407 days.

(21) Appl. No.: 11/685,966

(22) Filed: Mar. 14, 2007

(65) Prior Publication Data

US 2007/0220484 A1 Sep. 20, 2007

(30) Foreign Application Priority Data

Mar. 15, 2006 (JP) .................................. 2006-071777
Mar. 7, 2007 (JP) .................................. 2007-057887

(51) Int. Cl.
*G06F 3/12* (2006.01)
*H04N 1/00* (2006.01)
*H04N 1/32* (2006.01)
*H04N 1/04* (2006.01)

(52) U.S. Cl.
USPC ..................... 358/1.13; 358/401; 358/426.02; 358/442; 358/474

(58) Field of Classification Search .................. 358/474, 358/1.13, 401, 426.02, 442; 717/106, 107, 717/162, 109, 117, 151, 155, 156, 167; 709/228, 709/229, 236; 719/332, 327, 324, 321; 715/700, 715/704, 716, 746, 741, 744, 747, 740, 762, 715/763, 764, 771
See application file for complete search history.

(56) References Cited

U.S. PATENT DOCUMENTS

| | | | | |
|---|---|---|---|---|
| 5,872,569 A * | 2/1999 | Salgado et al. | ............... | 715/764 |
| 5,999,911 A * | 12/1999 | Berg et al. | ..................... | 705/7.26 |
| 6,286,129 B1 * | 9/2001 | Agarwal et al. | ............... | 717/105 |
| 6,380,951 B1 * | 4/2002 | Petchenkine et al. | ......... | 715/736 |
| 6,553,431 B1 * | 4/2003 | Yamamoto et al. | ............... | 710/8 |
| 7,100,147 B2 * | 8/2006 | Miller et al. | .................. | 717/102 |
| 7,120,699 B2 * | 10/2006 | Stork et al. | .................... | 709/239 |
| 7,263,661 B2 * | 8/2007 | Chavers et al. | ............... | 715/744 |

(Continued)

FOREIGN PATENT DOCUMENTS

| | | |
|---|---|---|
| EP | 0 977 118 A2 | 2/2000 |
| EP | 1 339 215 A1 | 8/2003 |

(Continued)

OTHER PUBLICATIONS

Office Action issued May 24, 2011 in Japanese Patent Application No. 2007-057887.

*Primary Examiner* — Twyler Haskins
*Assistant Examiner* — Jonathan Beckley
(74) *Attorney, Agent, or Firm* — Oblon, Spivak, McClelland, Maier & Neustadt, L.L.P.

(57) ABSTRACT

A flow implementation system is disclosed. The flow implementation system implements a flow created by a user into an image processing apparatus having at least one of a plotter and a scanner. The system includes a tool providing unit that provides the user with a tool for creating the flow by combining plural operations executable by the image processing apparatus and a condition for switching a path among the operations, and a flow implementing unit that implements the flow created by the user into the image processing apparatus.

15 Claims, 27 Drawing Sheets

U.S. PATENT DOCUMENTS

| | | | |
|---|---|---|---|
| 7,286,256 B2 * | 10/2007 | Herbert | 358/1.16 |
| 7,356,611 B1 * | 4/2008 | Stork et al. | 709/239 |
| 7,382,479 B2 * | 6/2008 | Hirose et al. | 358/1.15 |
| 7,408,658 B2 * | 8/2008 | Twede | 358/1.15 |
| 7,496,233 B2 * | 2/2009 | Kirihara et al. | 382/229 |
| 7,653,566 B2 * | 1/2010 | Kim et al. | 705/7.13 |
| 7,685,527 B2 * | 3/2010 | Yan et al. | 715/762 |
| 7,805,324 B2 * | 9/2010 | Green et al. | 705/7.27 |
| 7,899,679 B2 * | 3/2011 | MacKay et al. | 705/7.27 |
| 8,082,169 B2 * | 12/2011 | Crew et al. | 705/7.26 |
| 2003/0212831 A1 | 11/2003 | Yoshio | |
| 2004/0036904 A1 | 2/2004 | Kimbara | |
| 2004/0057065 A1 * | 3/2004 | Michimura et al. | 358/1.13 |
| 2004/0140986 A1 * | 7/2004 | Boldon | 345/700 |

FOREIGN PATENT DOCUMENTS

| | | |
|---|---|---|
| EP | 1 376 349 A1 | 1/2004 |
| EP | 1 387 566 A1 | 2/2004 |
| JP | 2002-287990 | 10/2002 |
| JP | 2003-233473 | 8/2003 |
| JP | 2003-256238 | 9/2003 |
| JP | 2003-263321 | 9/2003 |
| JP | 2004-280665 | 10/2004 |

* cited by examiner

FIG.6

```
Scan Paper() ;
if(Time("08:00","17:00") == TRUE && MailSubject("APPROVAL NOTICE") ==TRUE)
{
    Print() ;
}
else
{
    Send() ;
    Storage() ;
}
```

FIG.26

CONDITION DATA STRUCTURE

CONDITION 1
    { TYPE = BARCODE
        ID = id1
    X,Y,W,H = 10,10,20,20 }
    AND
    { TYPE = BARCODE
        ID = id2
    X,Y,W,H = 500,800,20,20
    Are data identical to "RICOH TARO"? }

FLOW IMPLEMENTATION SYSTEM, FLOW IMPLEMENTATION METHOD, RECORDING MEDIUM HAVING FLOW IMPLEMENTATION PROGRAM STORED THEREIN, AND IMAGE PROCESSING APPARATUS

BACKGROUND OF THE INVENTION

1. Field of the Invention

The present invention generally relates to a flow implementation system, a flow implementation method, a recording medium having a flow implementation program stored therein, and an image processing apparatus, and particularly relates to an image processing apparatus in which a created flow is implemented, a flow implementation system that implements the created flow into an image processing apparatus, a flow implementation method, and a recording medium having a flow implementation program stored therein.

2. Description of the Related Art

In recent years, image processing apparatuses (e.g. multifunction machines) that include hardware resources, applications, and controllers for providing services related to image processing with use of the hardware resources have gained widespread use. The multifunction machines, which are examples of the image processing apparatuses, provide functions of copier, fax machine, printer, etc., by using applications.

The multifunction machines have fixed flows of executing operations of these functions of the multifunction machines, and therefore the flows do not always suit users' tasks. In view of the foregoing, multifunction machines that allow installation of new applications developed by third party vendors or users are becoming popular (see Patent Documents 1 and 2).

For instance, there are multifunction machines that allow installation of new applications developed by third party vendors or users with use of SDKs (Software Development Kits). The SDK is a set of tools necessary for developing software by using certain technologies (programming languages, API, etc.). The multifunction machines can provide flows that suit users' tasks by implementing such applications developed with use of the SDKs.

However, development of applications using the SDKs requires high programming skills. It is therefore difficult to develop applications using the SDKs at the user level.

In the related art, there are multifunction machines that determine the order of operations of functions (e.g. scan paper→print→send) by using tools.

<Patent Document 1> Japanese Patent Laid-Open Publication No. 2003-256238
<Patent Document 2> Japanese Patent Laid-Open Publication No. 2002-287990

However, these related-art multifunction machines only determine the order of operations of the functions by using the tools, and cannot flexibly respond to flows of users' various complex tasks.

That is, it is necessary to develop applications by using the SDKs for making the multifunction machines flexibly respond to the flows of various complex tasks. As mentioned above, it is difficult to develop applications by using the SDKs at the user level. Therefore, if users want to make the multifunction machines flexibly respond to the various complex tasks, the users need to ask third party vendors to develop applications.

SUMMARY OF THE INVENTION

The present invention is directed to a flow implementation system capable of easily and flexibly implementing various complex flows, a flow implementation method, a recording medium having a flow implementation program stored therein, and an image processing apparatus.

According to an aspect of the present invention, there is provided a flow implementation system that implements a flow created by a user into an image processing apparatus having at least one of a plotter and a scanner. The system comprises: a tool providing unit that provides the user with a tool for creating the flow by combining plural operations executable by the image processing apparatus and a condition for switching a path among the operations; and a flow implementing unit that implements the flow created by the user into the image processing apparatus.

According to another aspect of the present invention, there is provided a flow implementation method that implements a flow created by a user into an image processing apparatus having at least one of a plotter and a scanner. The method comprises: a tool providing step in which the tool providing unit provides the user with a tool for creating the flow by combining plural operations executable by the image processing apparatus and a condition for switching a path among the operations; and a flow implementing step in which a flow implementing unit implements the flow created by the user into the image processing apparatus.

According to still another aspect of the present invention, there is provided a recording medium having a flow implementation program stored therein. The program causes a computer to execute: a tool providing process of providing a user with a tool for creating a flow by combining plural operations executable by an image processing apparatus and a condition for switching a path among the operations, the image processing apparatus having at least one of a plotter and a scanner; and a flow implementing process of implementing the flow created by the user into the image processing apparatus.

According to a further aspect of the present invention, there is provided an image processing apparatus that implements a flow created by a user. The image processing apparatus comprises: at least one of a plotter and a scanner; a tool providing unit that provides the user with a tool for creating the flow by combining plural operations executable by the image processing apparatus and a condition for switching a path among the operations; and a flow implementing unit that implements the flow created by the user into the image processing apparatus.

It is to be noted that methods, apparatuses, systems, computer programs, recording media, and data structures to which constituent elements of the present invention, expressions, or any combinations of the constituent elements are applied are also contemplated as embodiments of the present invention.

Thus, the present invention may provide a flow implementation system capable of easily and flexibly implementing various complex flows, a flow implementation method, a recording medium having a flow implementation program stored therein, and an image processing apparatus.

BRIEF DESCRIPTION OF THE DRAWINGS

FIG. 6 is a configuration diagram showing an example of task flow data;

FIG. 26 is a configuration diagram showing an example of task flow data;

DETAILED DESCRIPTION OF THE PREFERRED EMBODIMENT

The following describes preferred embodiments of the present invention with reference to the accompanying drawings. It is to be noted that although a multifunction machine having functions of printer, copier, fax machine, and the like integrated in a single casing is described as an example of an image processing apparatus in the following embodiments, the present invention is applicable to any image processing apparatus that performs image processing. Also, although a task flow is illustrated as an example of a flow in the following embodiments, the present invention is applicable to any flow.

Figure 1:
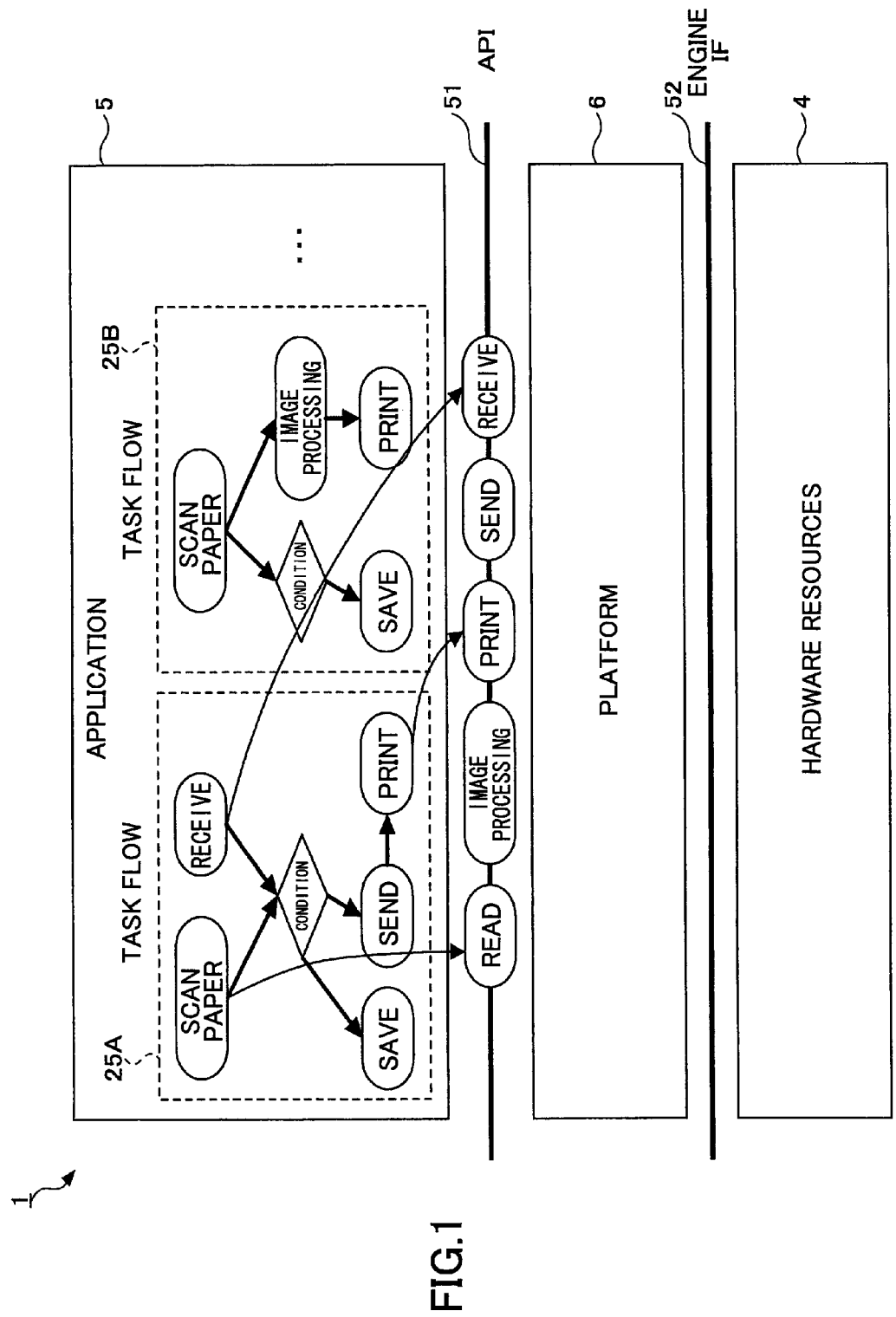
FIG. 1 is a diagram for explaining details of a task flow according to an embodiment of the present invention.

The following provides an overview of the present invention in order to facilitate understanding of the present invention. FIG. 1 is a diagram for explaining details of a task flow according to an embodiment of the present invention. A multifunction machine 1 includes hardware resources 4, an application layer 5, and a platform 6.

The hardware resources 4 include a plotter, a scanner, a fax machine, etc. The application layer 5 includes a program for executing operations related to image processing such as operations of printer, copier, fax machines, and scanner, or operations related to a task flow. Each program included in the application layer 5 corresponds to one processing task performed by the multifunction machine 1. The application layer 5 of FIG. 1 includes a task flow 25A and a task flow 25B.

It is to be noted that the reference numeral 25 indicates any of the task flows 25A and 25B. Although FIG. 1 shows the configuration of the multifunction machine 1 in which two task flows 25 are included by way of example, the number of the task flows 25 is not limited to two.

The platform 6 reads a request from the application layer 5 and issues a request for assignment of the hardware resources 4. The platform 6 has an API 51 for receiving the request from the application layer 5 by a predetermined function.

The task flows 25A and 25B of FIG. 1 are examples of task flows that are created so as to suit users' tasks. The task flow 25 is described in detail hereinafter with reference to FIG. 1.

Components necessary for the following description are shown in the multifunction machine 1 of FIG. 1. The task flows 25A and 25B of FIG. 1 are created by combining plural operations executable by the multifunction machine 1 and conditions for switching a path among the operations (conditions for executing the operations). The executable operations may include read, image processing, print, send, and receive operations.

As the multifunction machine 1 of the present invention can create the task flow 25 by combining the executable operations and the conditions for switching a path among the operations, the multifunction machine 1 can flexibly respond to various complex task flows of users.

Moreover, in order to facilitate creation of task flows suitable for users' tasks, the multifunction machine 1 of the present invention provides users with a tool for creating task flows as easily as creating flowcharts. The details of the tool are described below. The multifunction machine 1 of the present invention thus facilitates task flow creation that has conventionally required high programming skills. The present invention is described below in detail with reference to Embodiments 1 through 4.

Embodiment 1

Figure 2:
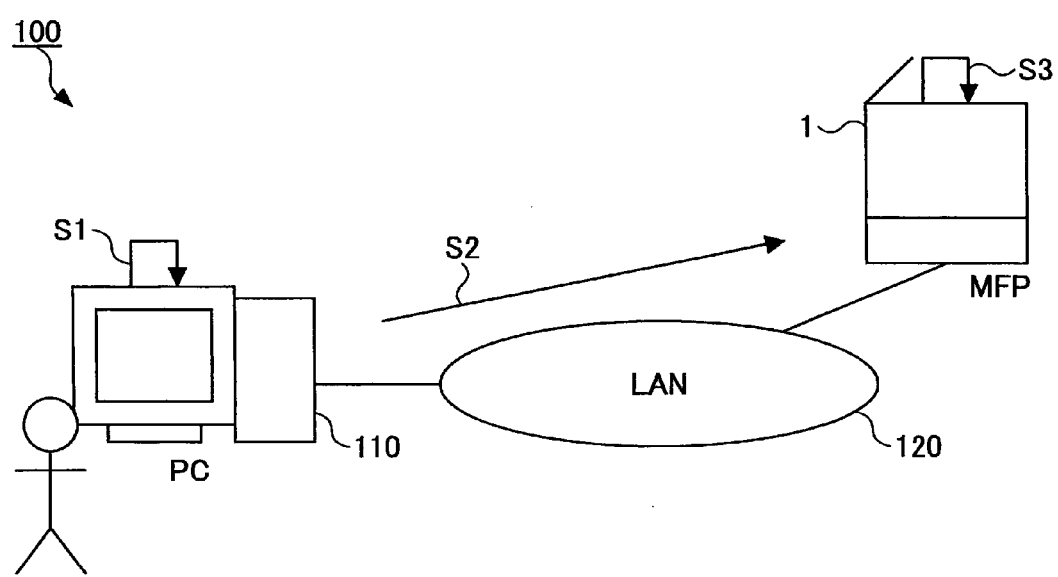
FIG. 2 is a conceptual diagram showing a task flow implementation system according to an embodiment of the present invention.

FIG. 2 is a conceptual diagram showing a task flow implementation system 100 according to Embodiment 1 of the present invention. In the task flow implementation system 100 of FIG. 2, a PC 110 is connected to a multifunction machine (MFP) 1 via a network 120 such as a LAN. The PC 110 is an example of a user terminal.

The task flow implementation system 100 of Embodiment 1 creates a user-specific task flow using a tool on the PC 110 and implements the task flow into the multifunction machine 1. The task flow implementation system 100 implements a task flow into the multifunction machine 1 by taking the following steps, for example.

In Step S1, a user creates a task flow using the tool provided on the PC 110. Based on user's operations, the PC 110 creates task flow data representing the task flow created by the user. In Step S2, the PC 110 sends the created task flow data to the multifunction machine 1. Then, in Step S3, the multifunction machine 1 registers the received task flow data so as to implement the task flow thereinto.

Figure 3:
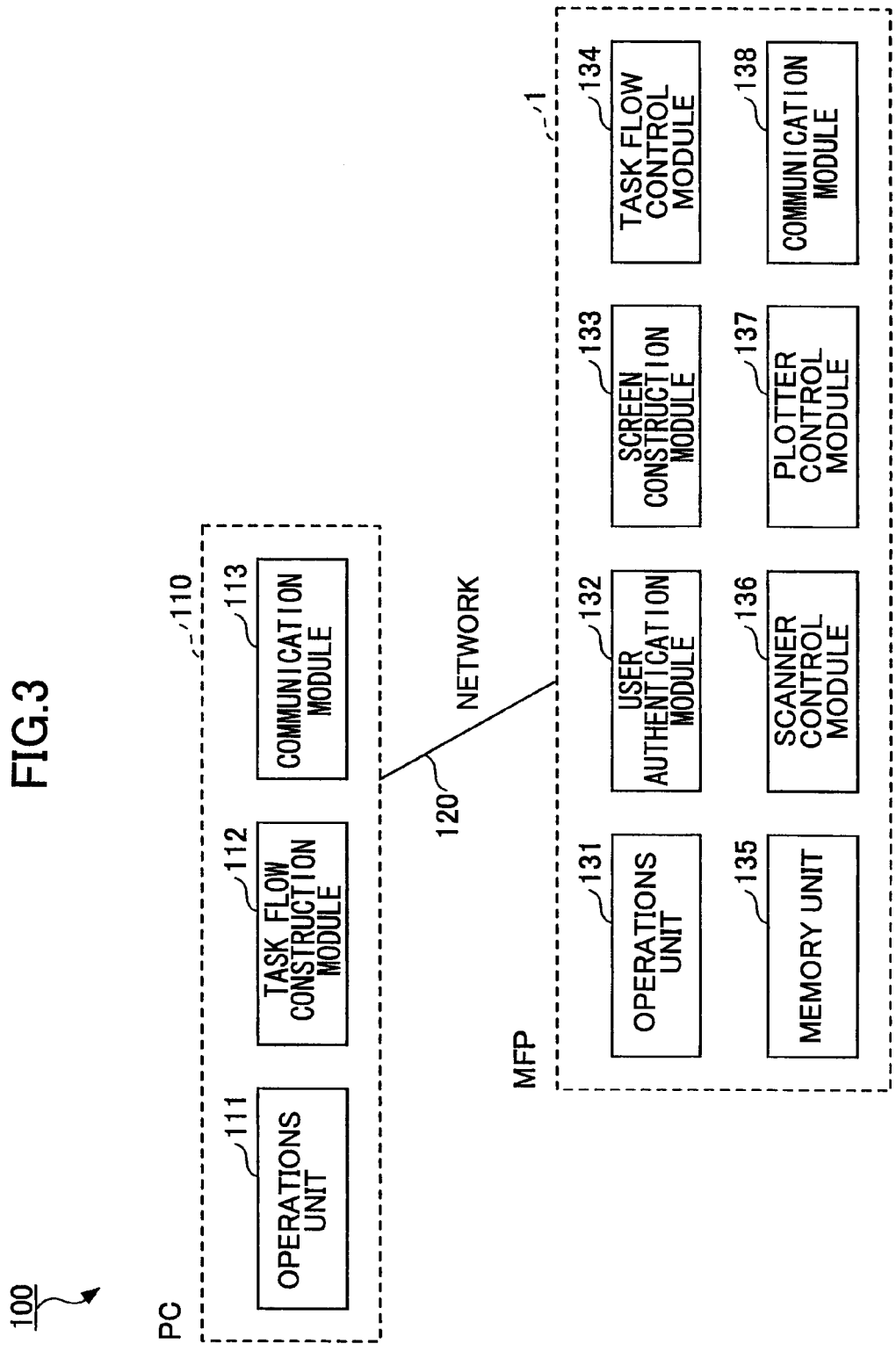
FIG. 3 is a system configuration diagram showing a task flow implementation system according to an embodiment of the present invention.

FIG. 3 is a system configuration diagram showing a task flow implementation system 100 according to one embodiment of the present invention. Similar to the task flow implementation system 100 of FIG. 2, in the task flow implementation system 100 of FIG. 3, a PC 110 is connected to a multifunction machine 1 via a network 120 such as a LAN.

The PC 110 includes an operations unit 111, a task flow construction module 112, and a communication module 113. The multifunction machine 1 includes an operations unit 131, a user authentication module 132, a screen construction module 133, a task flow control module 134, a memory unit 135, a scanner control module 136, a plotter control module 137, and a communication module 138. The configuration of the multifunction machine 1 of FIG. 3 is realized with the software configuration and the hardware configuration of FIG. 1. The processing procedures of the multifunction machine 1 and the PC 110 of FIG. 3 are described with reference to FIG. 4.

Figure 4:
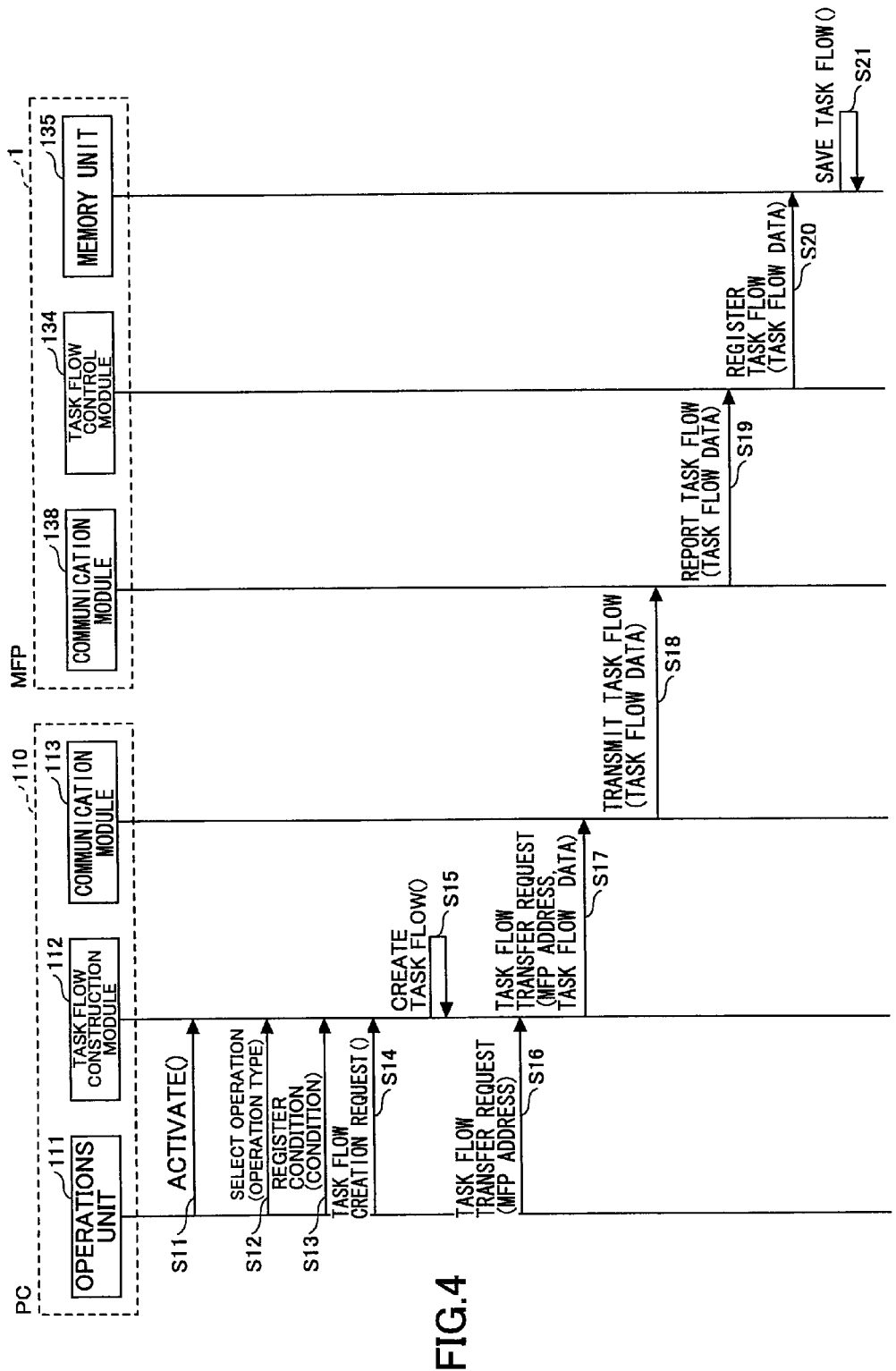
FIG. 4 is a sequence diagram showing an example of a processing procedure of a task flow implementation system according to an embodiment of the present invention.

FIG. 4 is a sequence diagram showing an example of a processing procedure of the task flow implementation system 100 according to one embodiment of the present invention. A user who wants to create a task flow instructs activation of a tool by using the operations unit 111. In Step S11, the operations unit 111 activates the task flow construction module 112. When the task flow construction module 112 is activated, a user interface screen (UI screen) 1000 of FIG. 5 of the tool is displayed on the operations unit 111.

Figure 5:
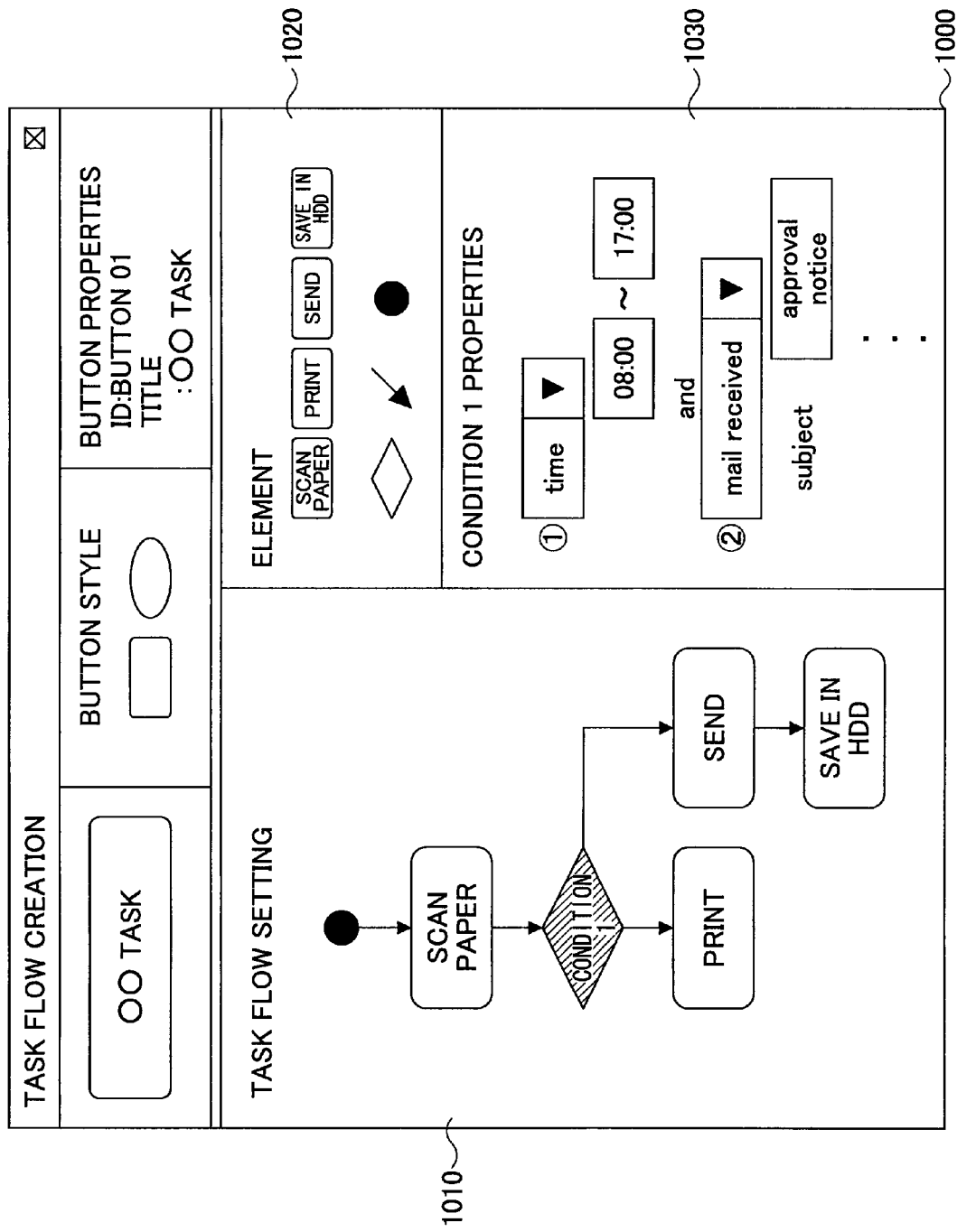
FIG. 5 is a conceptual diagram showing an example of a UI screen of a tool.

FIG. 5 is a conceptual diagram showing an example of the UI screen 1000 of the tool. The UI screen 1000 of FIG. 5 includes a task flow field 1010 for creating a task flow, an element field 1020 for selecting elements that visually represent operations executable by the multifunction machine 1 and conditions for switching a path among the operations, and a condition field 1030 for configuring the conditions for switching a path among the operations.

With use of the operations unit 111, the user sequentially selects the elements in the element field 1020 and creates a task flow with the selected elements in the task flow field 1010. In Step S12, the operations unit 111 reports the elements selected by the user and the locations of the elements in the task flow field 1010 to the task flow construction module 112.

Further, with use of the operations unit 111, the user selects an element "CONDITION 1" visually representing a condition for switching a path among operations in the task flow field 1010 and configures the condition in the condition field 1030. In Step S13, the operations unit 111 reports the condition set by the user to the task flow construction module 112. Conditions that can be set in the condition field 1030 are described below in detail.

In this way, the user can create a task flow as if creating a flowchart by using the UI screen 1000 of FIG. 5. Therefore, the user can easily create the task flow even without specialized programming knowledge.

When creation of the task flow is completed, the user instructs completion of the creation of the task flow through the operations unit 111. In Step S14, the operations unit 111 issues a task flow creation request to the task flow construction module 112. In Step S15, based on the task flow created by the user by using the UI screen 1000, the task flow construction module 112 creates task flow data representing the task flow. The task flow data are, for example, script data.

FIG. 6 is a configuration diagram showing an example of the task flow data. The task flow data of FIG. 6 comprise a script created based on the task flow created on the UI screen 1000 of FIG. 5. Registration of the task flow data of FIG. 6 into the multifunction machine 1 enables the multifunction machine 1 to execute the task flow created by the user by using the UI screen 1000.

Then, with use of the operations unit 111, the user specifies the multifunction machine 1 into which the task flow is to be registered, and instructs registration of the task flow into the multifunction machine 1. In Step S16, the operations unit 111 issues a task flow transfer request to the task flow construction module 112. The task flow transfer request of Step S16 includes an address or the like for specifying the multifunction machine 1.

In Step S17, the task flow construction module 112 issues a task flow transfer request to the communication module 113. The task flow transfer request of Step S17 includes the address for specifying the multifunction machine 1 and the task flow data. In Step S18, the communication module 113 sends the task flow data to the communication module 138 of the multifunction machine 1.

In Step S19, the communication module 138 reports the task flow data, which are received from the communication module 113 of the PC 110, to the task flow control module 134. In Step S20, the task flow control module 134 sends the task flow data to the memory unit 135 and requests registration of the task flow data. In Step S21, the memory unit 135 saves the received task flow data therein.

Figure 7:
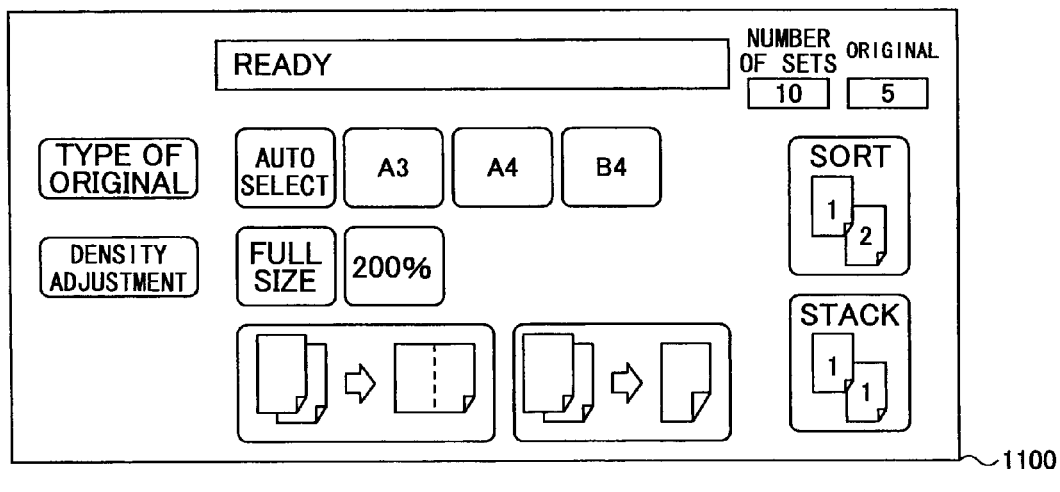
FIG. 7 is a conceptual diagram showing differences between UI screens before and after implementation of a task flow.
Figure 7:
Figure 7:
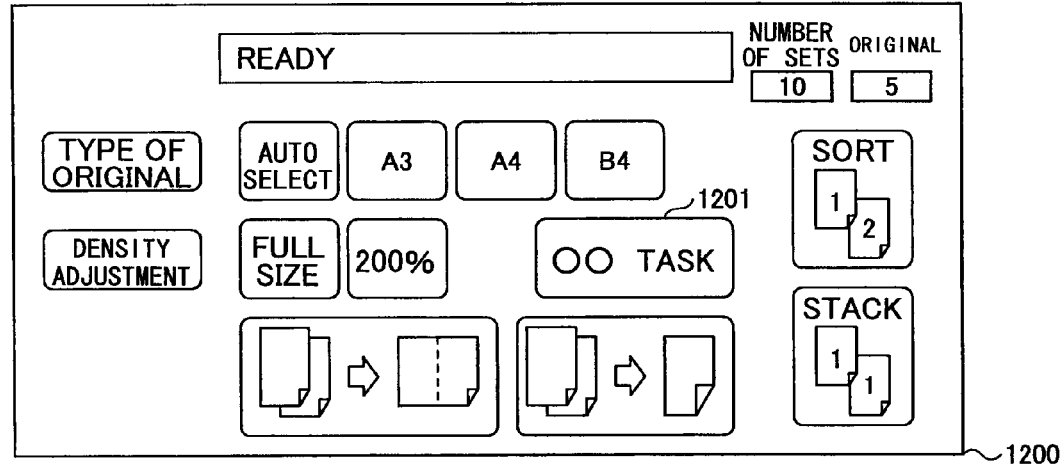

In this manner, the multifunction machine 1 saves the received task flow data in the memory unit 135 to register the task flow data, thereby implementing the task flow corresponding to the task flow data. When the task flow is implemented, a UI screen 1100 for image processing that has been displayed on the operations unit 131 of the multifunction machine 1 is changed to a UI screen 1200 on which a "oo TASK" button 1201 for executing the implemented task flow is added. FIG. 7 is a conceptual diagram showing differences between the UI screens 1100 and 1200 before and after implementation of the task flow.

As the task flow implementation system 100 of this embodiment of the present invention can create the task flow by combining the operations executable by the multifunction machine 1 and the conditions for switching a path among the operations, the multifunction machine 1 can readily and flexibly respond to various complex task flows of users.

Embodiment 2

Figure 8:
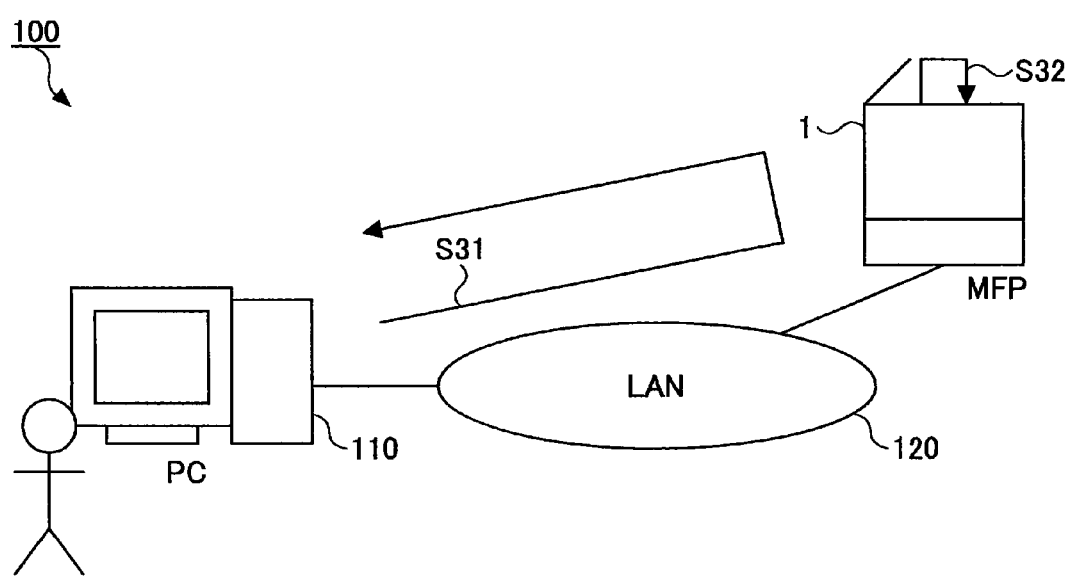
FIG. 8 is a conceptual diagram showing a task flow implementation system according to an embodiment of the present invention.

FIG. 8 is a conceptual diagram showing a task flow implementation system 100 according to Embodiment 2 of the present invention. Similar to the task flow implementation system 100 of FIG. 2, in the task flow implementation system 100 of FIG. 8, a PC 110 is connected to a multifunction machine 1 via a network 120 such as a LAN.

The task flow implementation system 100 of Embodiment 2 can create a user-specific task flow with use of a tool on the multifunction machine 1 by remotely operating the tool from the PC 110, and can implement the task flow into the multifunction machine 1. The task flow implementation system 100 of FIG. 8 implements a task flow into the multifunction machine 1 by taking the following steps, for example.

In Step S31, a user creates a user-specific task flow with use of the tool on the multifunction machine 1 by remotely operating the tool from the PC 110. Based on user's operations, the multifunction machine 1 creates task flow data representing the task flow created by the user. Then, in Step S32, the multifunction machine 1 registers the created task flow data so as to implement the task flow thereinto.

Figure 9:
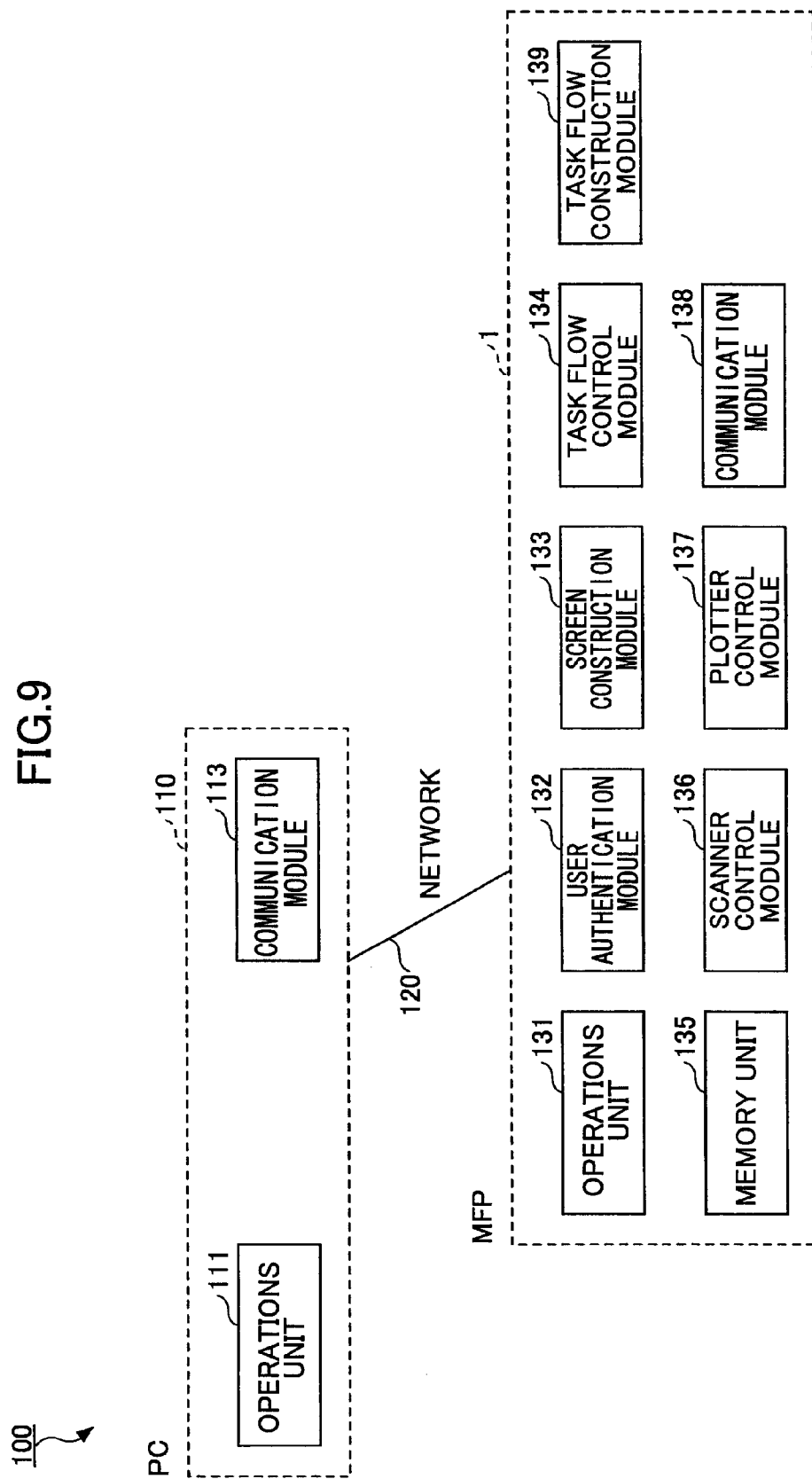
FIG. 9 is a system configuration diagram showing a task flow implementation system according to an embodiment of the present invention.

FIG. 9 is a system configuration diagram showing a task flow implementation system 100 according to one embodiment of the present invention. Similar to the task flow implementation system 100 of FIG. 8, in the task flow implementation system 100 of FIG. 9, a PC 110 is connected to a multifunction machine 1 via a network 120 such as a LAN.

The PC 110 includes an operations unit 111 and a communication module 113. The multifunction machine 1 includes an operations unit 131, a user authentication module 132, a screen construction module 133, a task flow control module 134, a memory unit 135, a scanner control module 136, a plotter control module 137, a communication module 138, and a task flow construction module 139. The configuration of the multifunction machine 1 of FIG. 9 is realized with the software configuration and the hardware configuration of FIG. 1. The processing procedures of the multifunction machine 1 and the PC 110 of FIG. 9 are described with reference to FIG. 10.

Figure 10:
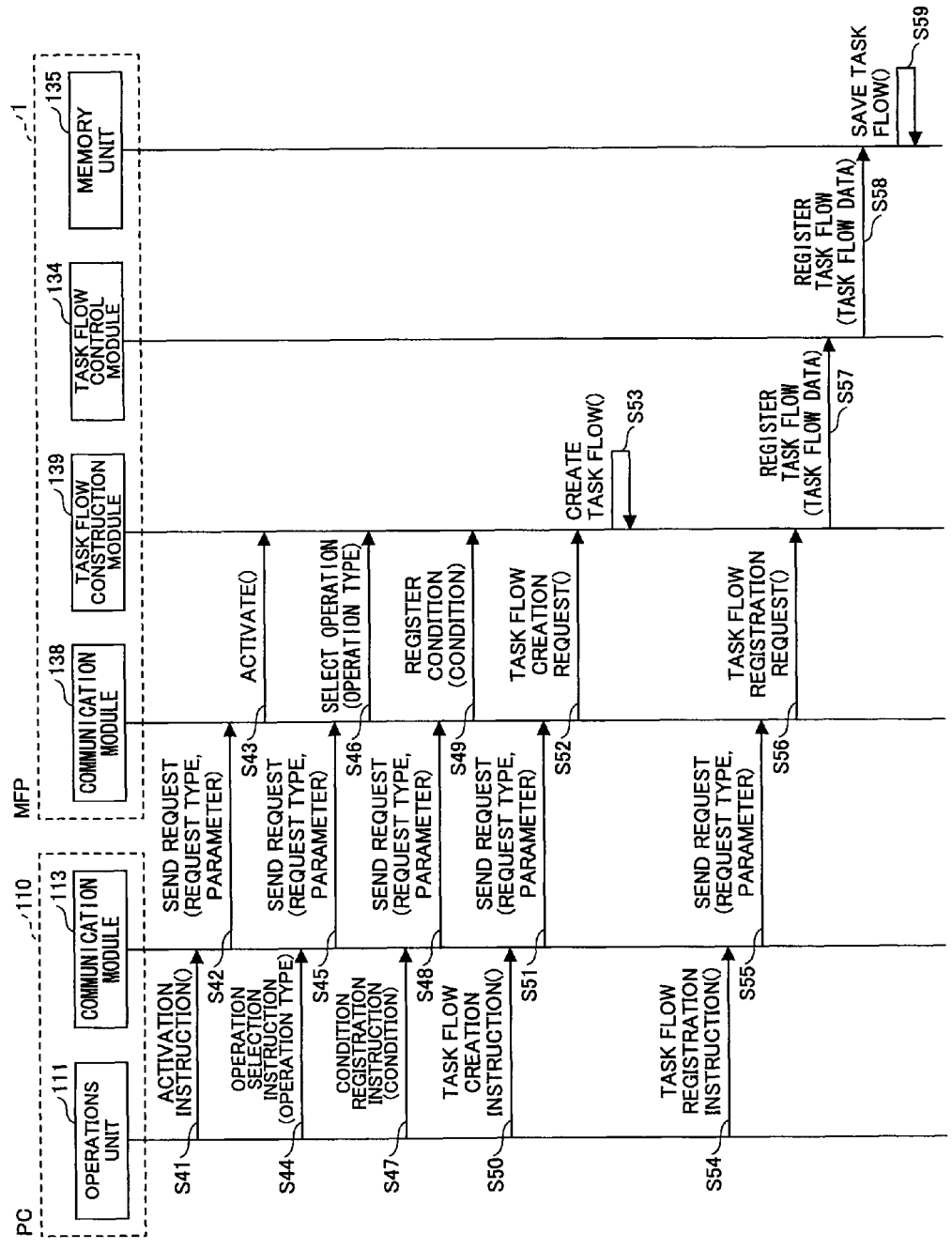
FIG. 10 is a sequence diagram showing an example of a processing procedure of a task flow implementation system according to an embodiment of the present invention.

FIG. 10 is a sequence diagram showing an example of a processing procedure of the task flow implementation system 100 according to one embodiment of the present invention. A user who wants to create a task flow instructs activation of a tool by using the operations unit 111. In Step S41, the operations unit 111 sends a tool activation instruction to the communication module 113.

In Step S42, the communication module 113 sends a request corresponding to the tool activation instruction to the communication module 138. The request sent in Step S42 contains a type of the request and a parameter corresponding to the tool activation instruction.

In Step S43, the communication module 138 activates the task flow construction module 139. When the task flow construction module 139 is activated, the user interface screen (UI screen) 1000 of FIG. 5 of the tool is displayed on the operations unit 111 of the PC 110.

With use of the operations unit 111, the user sequentially selects the elements in the element field 1020 and creates a task flow with the selected elements in the task flow field 1010. In Step S44, the operations unit 111 reports the elements selected by the user and the locations of the elements in the task flow field 1010 to the communication module 113 together with an operation selection instruction.

In Step S45, the communication module 113 sends a request corresponding to the elements selected by the user and the locations of the elements in the task flow field 1010 to the communication module 138. The request sent in Step S45 contains the type of the request and a parameter corresponding to the elements selected by the user and the locations of the elements in the task flow field 1010.

In Step S46, the communication module 138 reports the elements selected by the user and the locations of the elements in the task flow field 1010 to the task flow construction module 139. When the elements selected by the user and the locations of the elements in the task flow field 1010 are reported to the task flow construction module 139, the UI screen 1000 displayed on the operations unit 111 of the PC 110 is updated.

Further, with use of the operations unit 111, the user selects an element "CONDITION 1" visually representing a condition for switching a path among the operations in the task flow field 1010 and configures the condition in the condition field 1030. In Step S47, the operations unit 111 reports the condition to the communication module 113 together with a condition registration instruction. In Step S48, the communication module 113 sends a request corresponding to the condition to the communication module 138. The request sent in Step S48 contains the type of the request and a parameter corresponding to the condition.

In Step S49, the communication module 138 reports the condition to the task flow construction module 139. When the condition is reported to the task flow construction module 139, the UI screen 1000 displayed on the operations unit 111 of the PC 110 is updated.

In this way, the user can create a task flow as if creating a flowchart by using the UI screen 1000 of FIG. 5. Therefore, the user can easily create the task flow even without specialized programming knowledge.

When creation of the task flow is completed, the user instructs completion of the creation of the task flow through the operations unit 111. In Step S50, the operations unit 111 sends a task flow creation instruction to the communication module 113. In Step S51, the communication module 113 sends a request corresponding to the task flow creation instruction to the communication module 138. The request sent in Step S51 contains the type of the request and a parameter corresponding to the task flow creation instruction.

In Step S52, the communication module 138 issues a task flow creation request to the task flow construction module 139. In Step S53, based on the task flow created by the user by using the UI screen 1000, the task flow construction module 139 creates task flow data representing the task flow.

Then, with use of the operations unit 111, the user instructs registration of the task flow into the multifunction machine 1. In Step S54, the operations unit 111 sends a task flow registration instruction to the communication module 113. In Step S55, the communication module 113 sends a request corresponding to the task flow registration instruction to the communication module 138. The request sent in Step S55 contains the type of the request and a parameter corresponding to the task flow registration instruction.

In Step S56, the communication module 138 issues a task flow registration request to the task flow construction module 139. In Step S57, the task flow construction module 139 issues a task flow registration request to the task flow control module 134. The task flow registration request issued in Step S57 contains the task flow data.

In Step S58, the task flow control module 134 sends the task flow data to the memory unit 135 and requests registration of the task flow data. In Step S59, the memory unit 135 saves the received task flow data therein.

In this manner, the multifunction machine 1 saves the received task flow data in the memory unit 135 to register the task flow data, thereby implementing the task flow corresponding to the task flow data. When the task flow is implemented, the UI screen 1100 for image processing that has been displayed on the operations unit 131 of the multifunction machine 1 is changed to the UI screen 1200 on which the "oo TASK" button 1201 for executing the implemented task flow is added.

As the task flow implementation system 100 of this embodiment of the present invention can create the task flow by combining the operations executable by the multifunction machine 1 and the conditions for switching a path among the operations, the multifunction machine 1 can readily and flexibly respond to various complex task flows of users.

Embodiment 3

Figure 11:
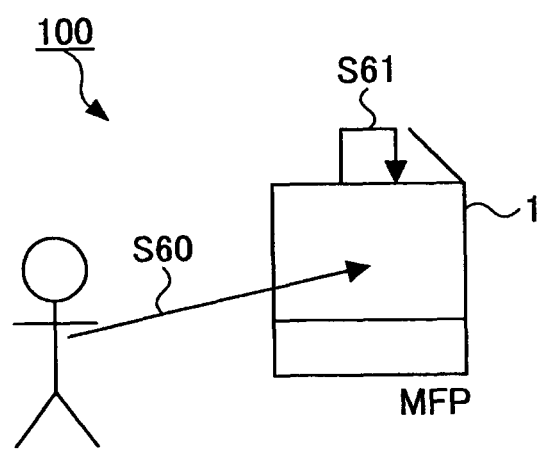
FIG. 11 is a conceptual diagram showing a task flow implementation system according to an embodiment of the present invention.

FIG. 11 is a conceptual diagram showing a task flow implementation system 100 according to Embodiment 3 of the present invention. The task flow implementation system 100 of FIG. 11 differs from the task flow implementation systems 100 of FIG. 2 and FIG. 8 in comprising a single multifunction machine 1.

The task flow implementation system 100 of Embodiment 3 can create a user-specific task flow with use of a tool on the multifunction machine 1 by operating the tool through the operations unit 131 of the multifunction machine 1, and can implement the task flow into the multifunction machine 1. The task flow implementation system 100 of FIG. 11 implements a task flow into the multifunction machine 1 by taking the following steps, for example.

In Step S60, a user creates a user-specific task flow with use of the tool on the multifunction machine 1 by operating the tool through the operations unit 131 of the multifunction machine 1. Based on user's operations, the multifunction machine 1 creates task flow data representing the task flow created by the user. Then, in Step S61, the multifunction machine 1 registers the created task flow data so as to implement the task flow thereinto.

Figure 12:
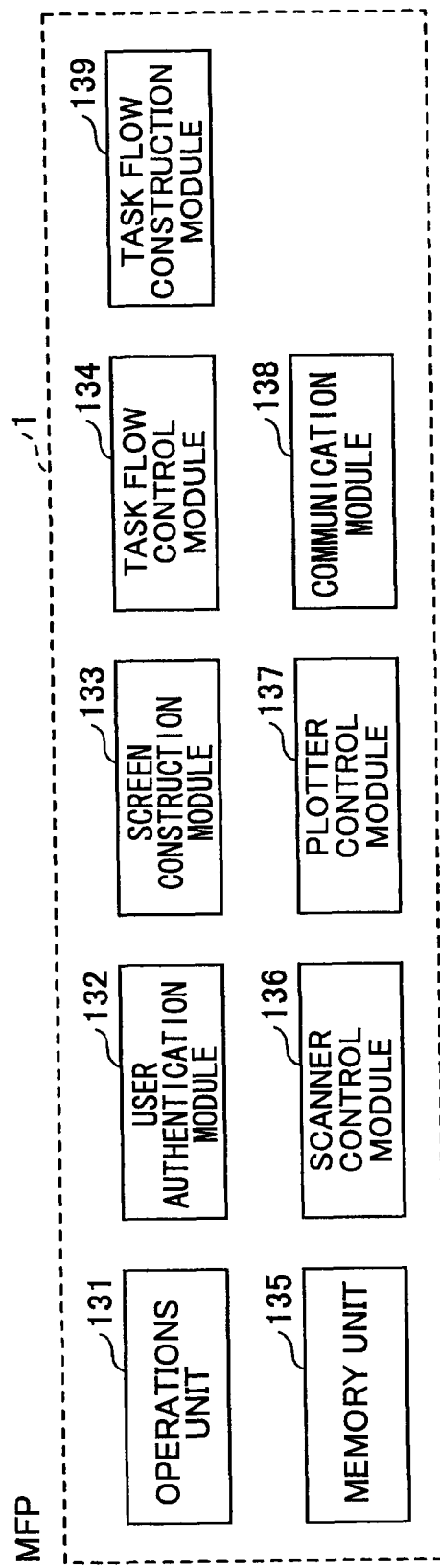
FIG. 12 is a system configuration diagram showing a task flow implementation system according to an embodiment of the present invention.

FIG. 12 is a system configuration diagram showing a task flow implementation system 100 according to one embodiment of the present invention. Similar to the task flow implementation system 100 of FIG. 11, the task flow implementation system 100 comprises a single multifunction machine 1. The multifunction machine 1 includes an operations unit 131, a user authentication module 132, a screen construction module 133, a task flow control module 134, a memory unit 135, a scanner control module 136, a plotter control module 137, a communication module 138, and a task flow construction module 139. The configuration of the multifunction machine 1 of FIG. 12 is realized with the software configuration and the hardware configuration of FIG. 1. The processing procedure of the multifunction machine 1 of FIG. 12 is described with reference to FIG. 13.

Figure 13:
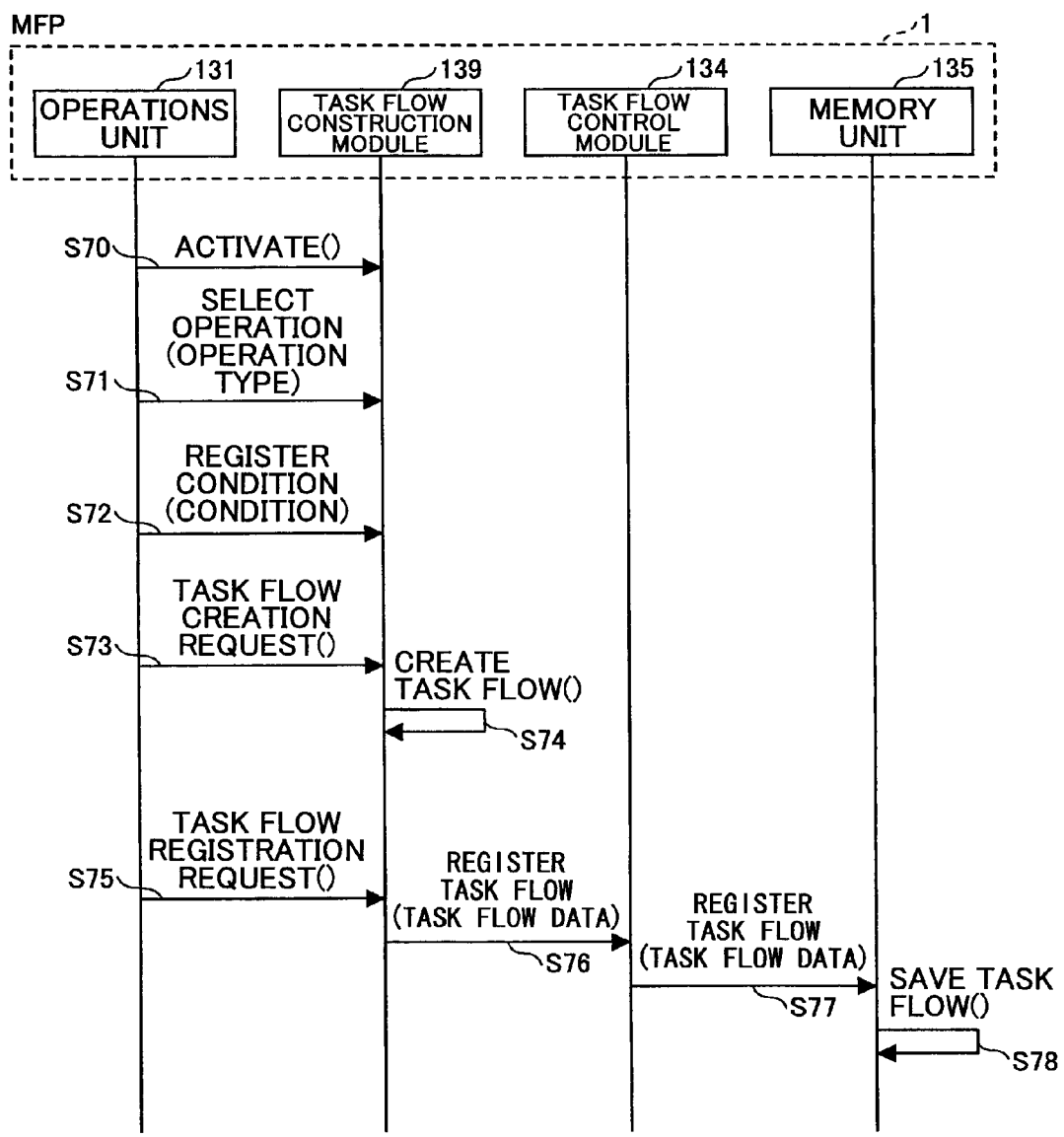
FIG. 13 is a sequence diagram showing an example of a processing procedure of a task flow implementation system according to an embodiment of the present invention.

FIG. 13 is a sequence diagram showing an example of a processing procedure of the task flow implementation system 100 according to one embodiment of the present invention. A user who wants to create a task flow instructs activation of a tool by using the operations unit 131. In Step S70, the operations unit 131 activates the task flow construction module 139. When the task flow construction module 139 is activated, the user interface screen 1000 of FIG. 5 of the tool is displayed on the operations unit 131.

With use of the operations unit 131, the user sequentially selects the elements in the element field 1020 and creates a task flow with the selected elements in the task flow field 1010. In Step S71, the operations unit 131 reports the elements selected by the user and the locations of the elements in the task flow field 1010 to the task flow construction module 139.

Further, with use of the operations unit 131, the user selects an element "CONDITION 1" visually representing a condition for switching a path among operations in the task flow field 1010 and configures the condition in the condition field 1030. In Step S72, the operations unit 131 reports the condition set by the user to the task flow construction module 139.

In this way, the user can create a task flow as if creating a flowchart by using the UI screen 1000 of FIG. 5. Therefore, the user can easily create the task flow even without specialized programming knowledge.

When creation of the task flow is completed, the user instructs completion of the creation of the task flow through the operations unit 131. In Step S73, the operations unit 131 issues a task flow creation request to the task flow construction module 139. In Step S74, based on the task flow created by the user by using the UI screen 1000, the task flow construction module 139 creates task flow data representing the task flow. Registration of the task flow data into the multifunction machine 1 enables the multifunction machine 1 to execute the task flow created by the user by using the UI screen 1000.

Then, with use of the operations unit 131, the user instructs registration of the task flow. In Step S75, the operations unit 131 issues a task flow registration request to the task flow construction module 139. In Step S76, the task flow construction module 139 issues a task flow registration request to the task flow control module 134.

In Step S77, the task flow control module 134 sends the task flow data to the memory unit 135 and requests registration of the task flow data. In Step S78, the memory unit 135 saves the received task flow data therein.

In this manner, the multifunction machine 1 saves the received task flow data in the memory unit 135 to register the task flow data, thereby implementing the task flow corresponding to the task flow data. When the task flow is implemented, the UI screen 1100 for image processing that has been displayed on the operations unit 131 of the multifunction machine 1 is changed to a UI screen 1200 on which a "oo TASK" button 1201 for executing the implemented task flow is added.

As the task flow implementation system 100 of this embodiment of the present invention can create the task flow by combining the operations executable by the multifunction machine 1 and the conditions for switching a path among the operations, the multifunction machine 1 can readily and flexibly respond to various complex task flows of users.

(Execution of Implemented Task Flow)

Figure 14:
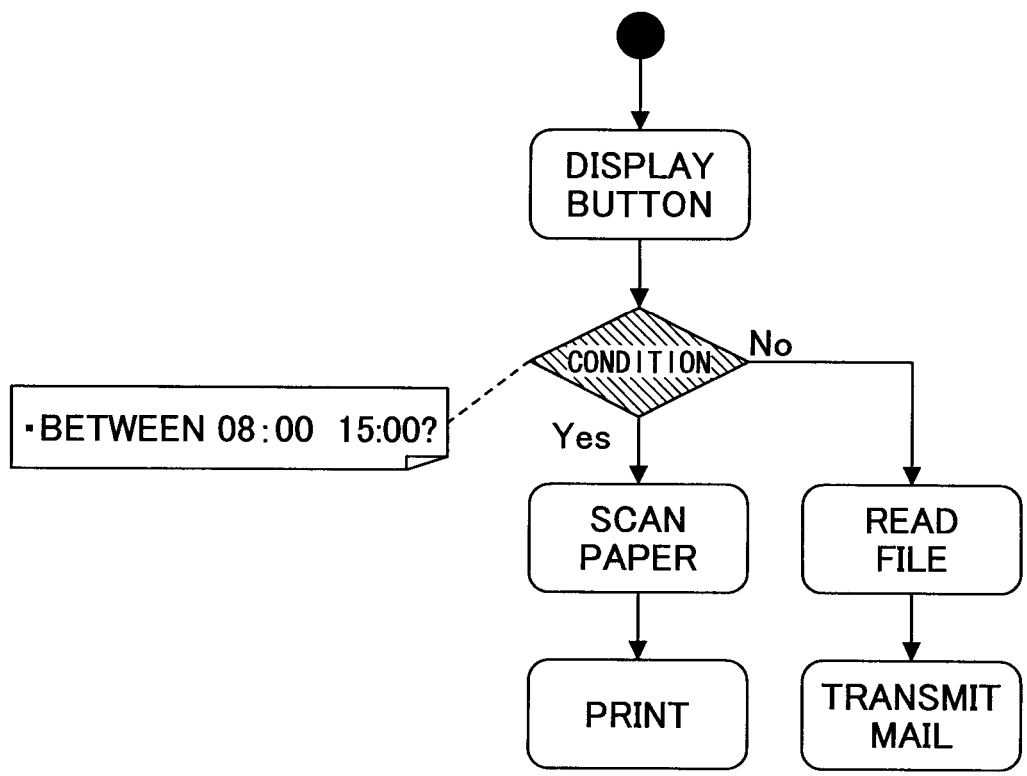
FIG. 14 is a diagram for explaining an example of a task flow implemented in a multifunction machine.

The multifunction machine 1 executes the implemented task flow as described below. In the following example, a task flow of FIG. 14 is implemented in the multifunction machine 1 of FIG. 3. FIG. 14 is a diagram for explaining the task flow implemented in the multifunction machine 1. The task flow of FIG. 14 is configured to display, e.g., the "oo TASK" button 1201 on the operations unit 131 and, if the time when the button 1201 is pressed is between 8:00 and 15:00, scan a paper document and execute a print operation. If the time when the button 1201 is pressed is not between 8:00 and 15:00, file reading and mail transmission operations are executed.

Figure 15:
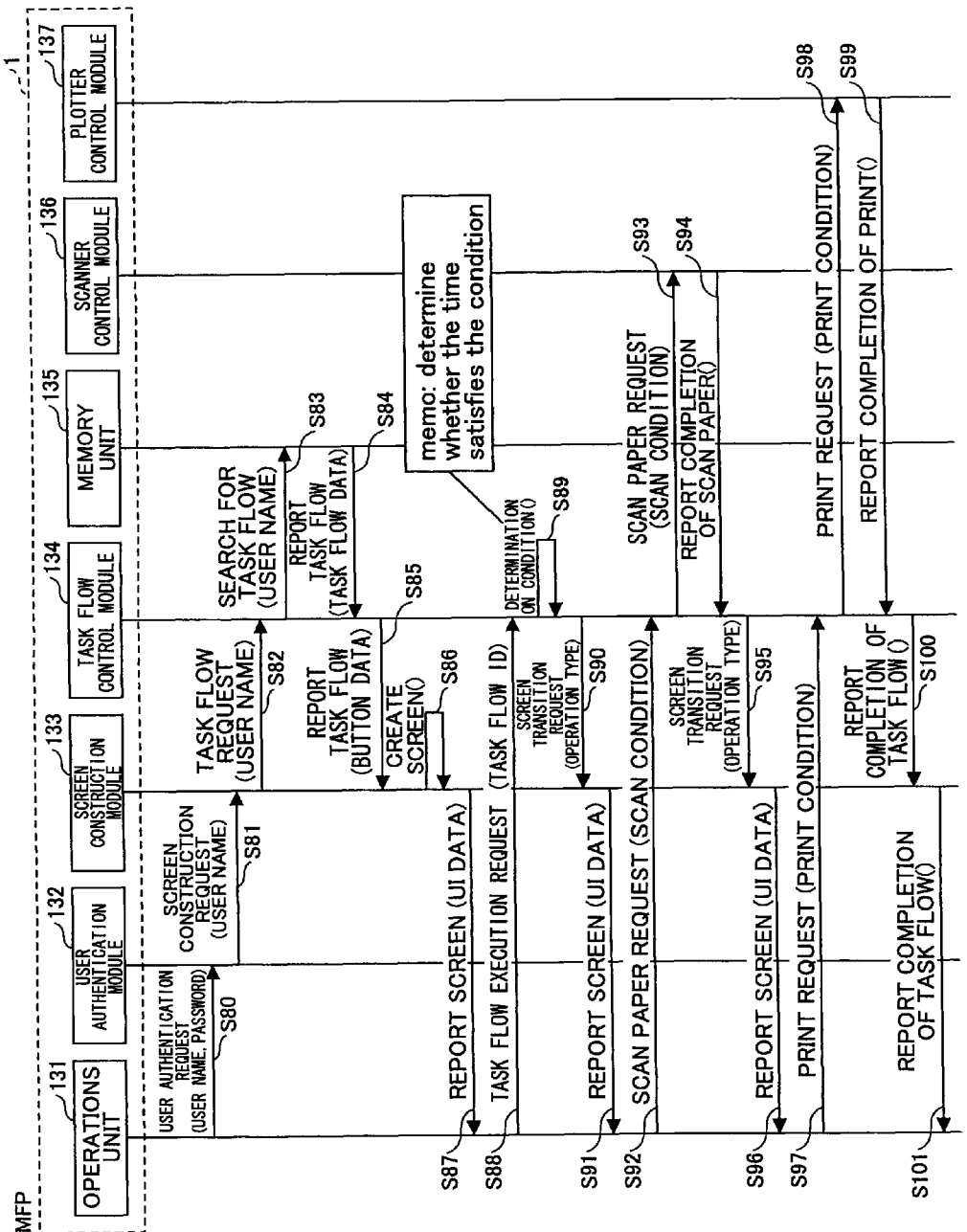
FIG. 15 is a sequence diagram showing an example of a processing procedure taken by a multifunction machine for executing a task flow.

In the case where the condition is satisfied in the task flow of FIG. 14, the multifunction machine 1 performs processing as shown in FIG. 15. FIG. 15 is a sequence diagram showing an example of a processing procedure taken by the multifunction machine 1 for executing a task flow.

A user who wants to execute the task flow enters a user name and a password through the operations unit 131. In Step S80, the operations unit 131 issues a user authentication request to the user authentication module 132. The user authentication request contains the user name and the password.

The user authentication module 132 performs user authentication based on the received user name and the password. If the user authentication succeeds, the procedure goes to Step S81 in which the user authentication module issues a screen construction request to the screen construction module 133. The screen construction request contains the user name.

In Step S82, the screen construction module 133 issues a task flow request to the task flow control module 134. The task flow request contains the user name. In Step S83, the task flow control module 134 searches the memory unit 135 using the user name as a key. In Step S84, the task flow control module 134 reads out task flow data corresponding to the user name from the memory unit 135.

In Step S85, the task flow control module 134 reports button data of, e.g., the "oo TASK" button 1201 of FIG. 7 contained in the task flow data to the screen construction module 133. In Step S86, the screen construction module 133 creates the UI screen 1200 including, e.g., the "oo TASK" button 1201 for executing the task flow.

In Step S87, the screen construction module 133 transmits UI data of the created UI screen 1200 to the operations unit 131. The operations unit 131 displays, e.g., the UI screen 1200 of FIG. 7 based on the received UI data.

The user presses the "oo TASK" button 1201 with use of the operations unit 131. In Step S88, the operations unit 131 issues a task flow execution request to the task flow control module 134. The task flow execution request contains a task flow ID. Upon reception of the task flow execution request, in step S89 the task flow control module 134 determines whether the condition is satisfied.

In the case of the task flow shown in FIG. 14, the task flow control module determines whether the "oo TASK" button 1201 is pressed between 8:00 and 15:00. As the sequence diagram of FIG. 15 shows the example in which the condition is satisfied, the task flow control module 134 determines that the condition is satisfied.

Then, in Step S90, the task flow control module 134 specifies the type of an operation (scan paper) and issues a screen transition request to the screen construction module 133. In Step S91, the screen construction module 133 transmits UI data of a UI screen corresponding to the type of the operation (scan paper) to the operations unit 131. The operations unit 131 displays a UI screen for issuing a scan paper request based on the received UI data.

The user places a paper document on a scan area, and presses a button for starting scanning the paper document by operating the operations unit 131. In Step S92, the operations unit 131 transmits the scan paper request to the task flow control module 134. The scan paper request contains a scan condition.

In Step S93, the task flow control module 134 transmits the scan paper request to the scanner control module 136. The scan paper request contains the scan condition. Upon reception of the scan paper request, the scanner control module 136 scans the image of the paper document according to the scan condition. In Step S94, the scanner control module 136 sends a scan paper completion report to the task flow control module 134.

In Step S95, the task flow control module 134 specifies the type of an operation and issues a screen transition request to the screen construction module 133. In Step S96, the screen construction module 133 transmits UI data of a UI screen corresponding to the type of the operation (print) to the operations unit 131. The operations unit 131 displays a UI screen for issuing a print request based on the received UI data.

The user presses a button for starting printing out the image scanned from the paper document by operating the operations unit 131. In Step S97, the operations unit 131 transmits the print request to the task flow control module 134. The print request contains a print condition.

In Step S98, the task flow control module 134 transmits the print request to the plotter control module 137. The print request contains the print condition. Upon reception of the print request, the plotter control module 137 prints out the image scanned from the paper document according to the print condition. In Step S99, the plotter control module 137 sends a print completion report to the task flow control module 134.

In Step S100, the task flow control module 134 transmits a task flow completion report to the screen construction module 133. In Step S101, the screen construction module 133 transmits the task flow completion report to the operations unit 131. Then, the operations unit 131 displays, e.g., a UI screen for reporting the completion of the task flow to the user based on the received task flow completion report.

In this manner, the multifunction machine (image processing apparatus) 1 of the present invention can easily execute the task flow created and implemented by the user.

(Conditions Incorporated in Task Flow)

The multifunction machine 1 can incorporate logic (e.g. a condition for starting an operation) into task flows as conditions, thereby implementing various complex task flows. The conditions that can be incorporated include the one shown in FIG. 14 and those shown in FIGS. 16 through 20. FIGS. 16 through 20 are diagrams for explaining examples of task flows implemented in the multifunction machine 1.

Figure 16:
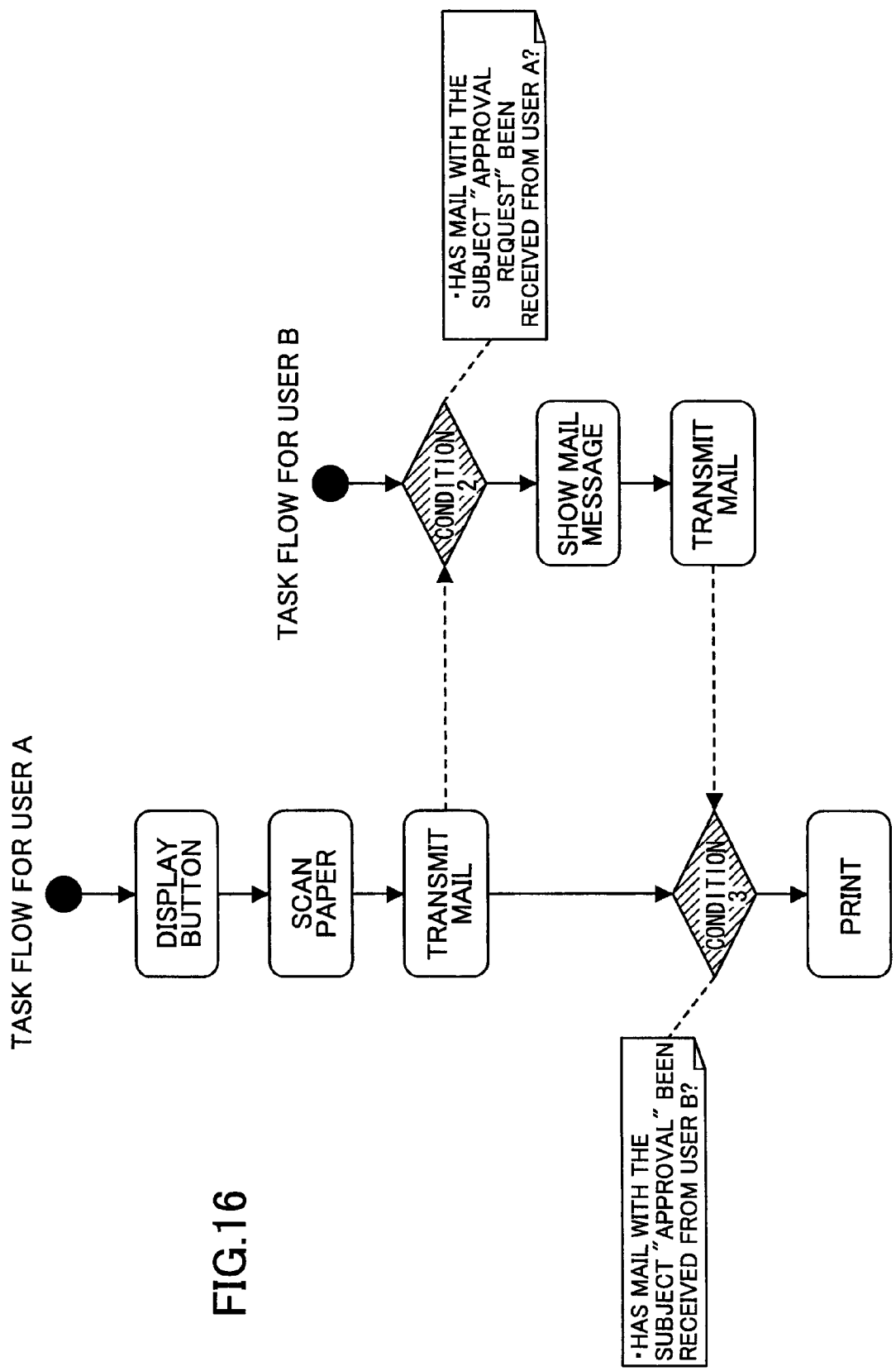
FIG. 16 is a diagram for explaining an example of a task flow implemented in a multifunction machine.

The task flow shown in FIG. 14 is configured to execute different operations depending on the time as described above. The task flow shown in FIG. 16 is configured to, if an event occurs, execute the operations that follow. For instance, in the task flow of FIG. 16, a print operation is executed if received mail satisfies a condition related to the subject, the sender of mail, or the like.

Figure 17:
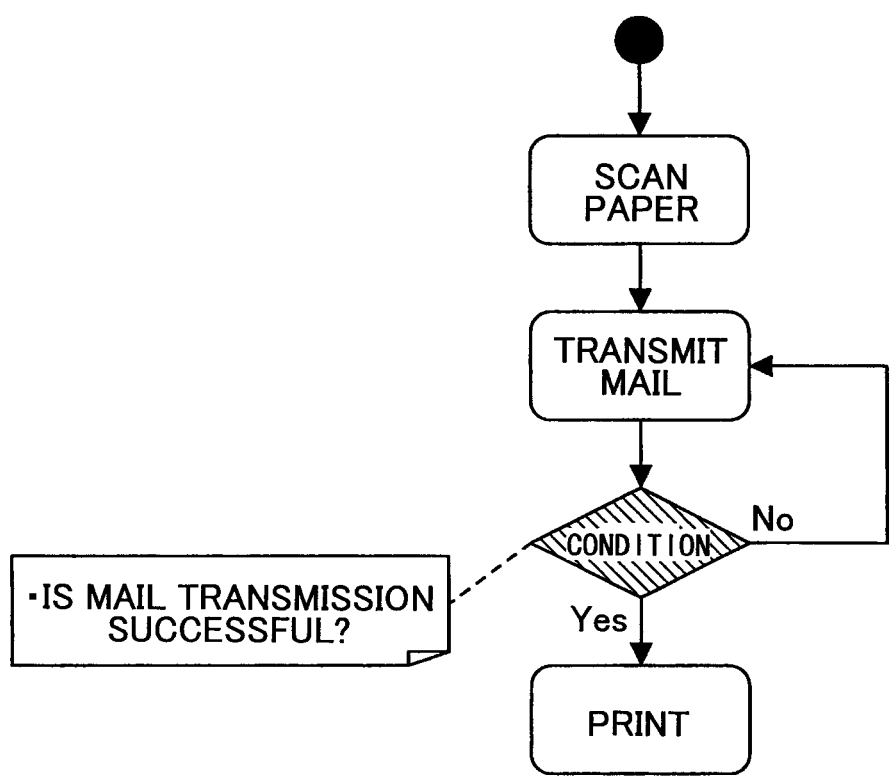
FIG. 17 is a diagram for explaining an example of a task flow implemented in a multifunction machine.

The task flow shown in FIG. 17 is configured to change subsequent behavior depending on the result of an executed operation. For instance, in the task flow of FIG. 17, if mail transmission succeeds, a print operation is executed. But, if mail transmission fails, the mail is retransmitted.

Figure 18:
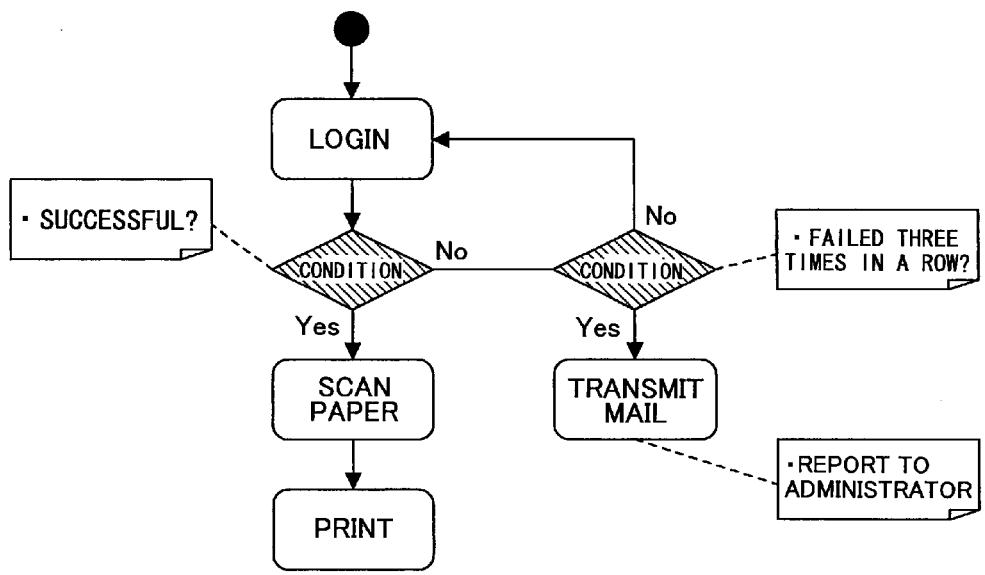
FIG. 18 is a diagram for explaining an example of a task flow implemented in a multifunction machine.

The task flow shown in FIG. 18 is configured to define the behavior if login fails. For example, in the task flow of FIG. 18, if login fails three times in a row, warning mail is transmitted to an administrator. The task flow of FIG. 18 may be configured to lock the multifunction machine 1 if login fails five times in a row. Occurrence of login failure and the number of login failures are confirmed by referring to log information. The task flow of FIG. 18 may be configured to prompt an output from another multifunction machine if a jam or a system error (SE) occurs in the multifunction machine 1.

Figure 19:
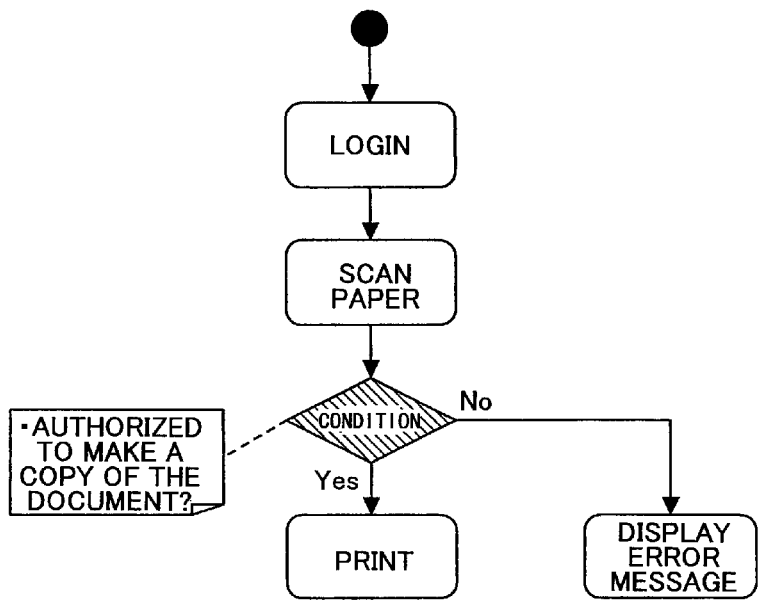
FIG. 19 is a diagram for explaining an example of a task flow implemented in a multifunction machine.

The task flow shown in FIG. 19 is configured to change the behavior depending on authentication information. For instance, in the task flow of FIG. 19, if a user has authority to make a copy of a scanned paper document, a print operation is executed. If, otherwise, a user does not have the authority, an error message is displayed. The determination whether a user has a right to make a copy of a scanned paper document is made based on user authentication information, authority information, and information contained in the scanned paper document.

Figure 20:
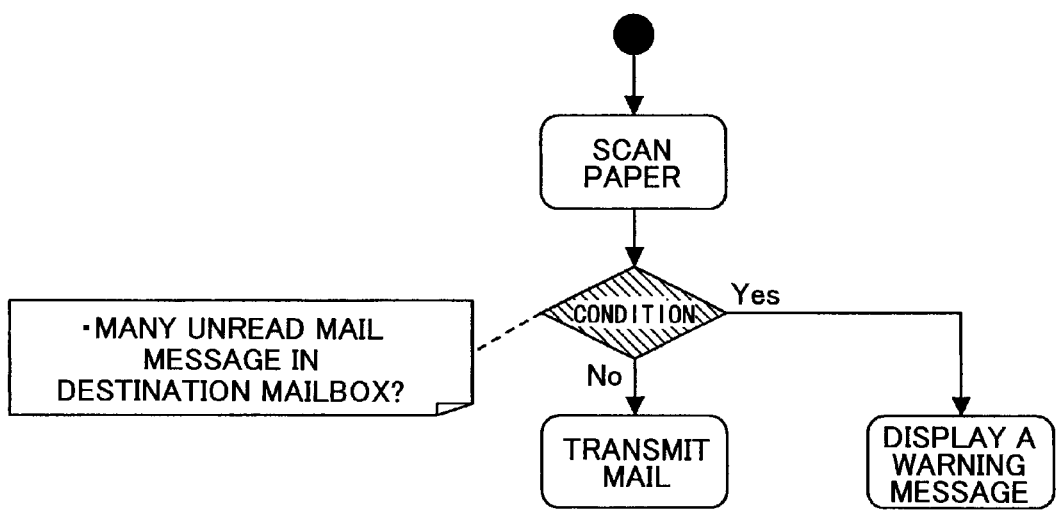
FIG. 20 is a diagram for explaining an example of a task flow implemented in a multifunction machine.

The task flow shown in FIG. 20 is configured to change the behavior depending on the status of another user. For example, in the task flow of FIG. 20, if there are a few unread mail messages in a destination mailbox, a mail transmission is executed. If, otherwise, there are many unread mail messages in a destination mailbox, a warning message is displayed to confirm whether to transmit mail.

As can be seen, the multifunction machine 1 of the present invention can incorporate various logic tests into task flows as conditions, thereby implementing various complex task flows.

(Other Examples of Execution of Implemented Task Flow)

In the above description, the task flow is executed upon a user operation on the operations unit 131. In an alternative embodiment, for example, the task flow may be started upon scanning a paper document with certain information printed thereon.

In the above description, the conditions for switching a path among the operations are incorporated in the task flow in advance. In an alternative embodiment, for example, the conditions for switching a path among the operations are printed on a paper document so that the conditions are read and incorporated into the task upon scanning the paper document.

Embodiment 4

Any one of the task flow implementation systems 100 of Embodiments 1 through 3 may be applicable as a task flow implementation system of Embodiment 4. In Embodiment 4, the task flow implementation system 100 of Embodiment 1 is described as an example. According to Embodiment 4, features of an image scanned from a paper document are incorporated as a condition in a task flow.

In the case where determination whether to satisfy the condition is made based on images scanned from paper documents, the determination may be made based on image features (layout, etc.) or information acquired from the image (barcodes, etc), for example.

When a user instructs activation of a tool, the operations unit 111 activates the task flow construction module 112. When the task flow construction module 112 is activated, a user interface screen 2000 of FIG. 21 of the tool is displayed on the operations unit 111.

Figure 21:
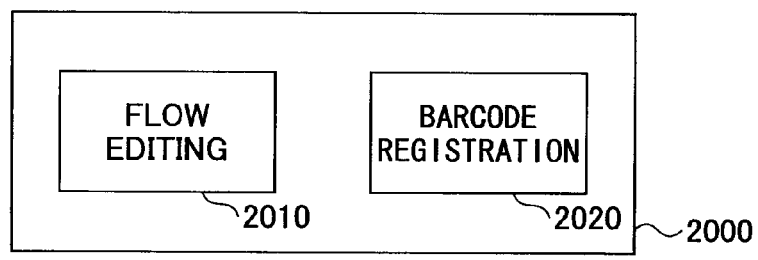
FIG. 21 is a conceptual diagram showing an example of a UI screen of a tool.

FIG. 21 is a conceptual diagram showing an example of the UI screen 2000 of the tool. The UI screen 2000 of FIG. 21 includes a button 2010 for moving to a UI screen for flow editing and a button 2020 for moving to a UI screen 2100 for barcode registration.

Figure 22:
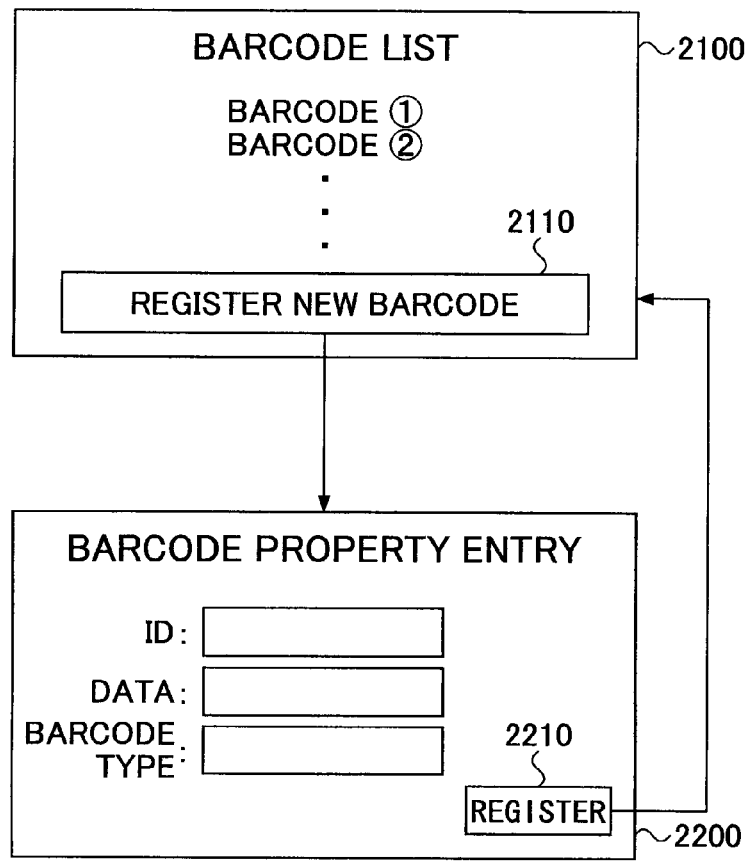
FIG. 22 is a conceptual diagram showing an example of a UI screen for barcode registration.

When the user presses the button 2020, the UI screen 2100 of FIG. 22 for barcode registration is displayed on the operations unit 111. The UI screen 2100 shows barcode names and barcode numbers for identifying barcodes. The UI screen 2100 includes a button 2110 for moving to a UI screen 2200 for barcode property entry.

When the user presses the button 2110, the UI screen 2200 of FIG. 22 for barcode property entry is displayed on the operations unit 111. The user enters an ID, data, and a barcode type on the UI screen 2200 by using the operations unit 111. The user presses a button 2210 so as to newly register a barcode corresponding to the properties entered on the UI screen 2200. Then, the UI screen 2100 is displayed again on the operations unit 111. It is to be noted that the task flow implementation systems 100 of Embodiment 2 and 3 can directly register the image of a barcode.

Figure 23:
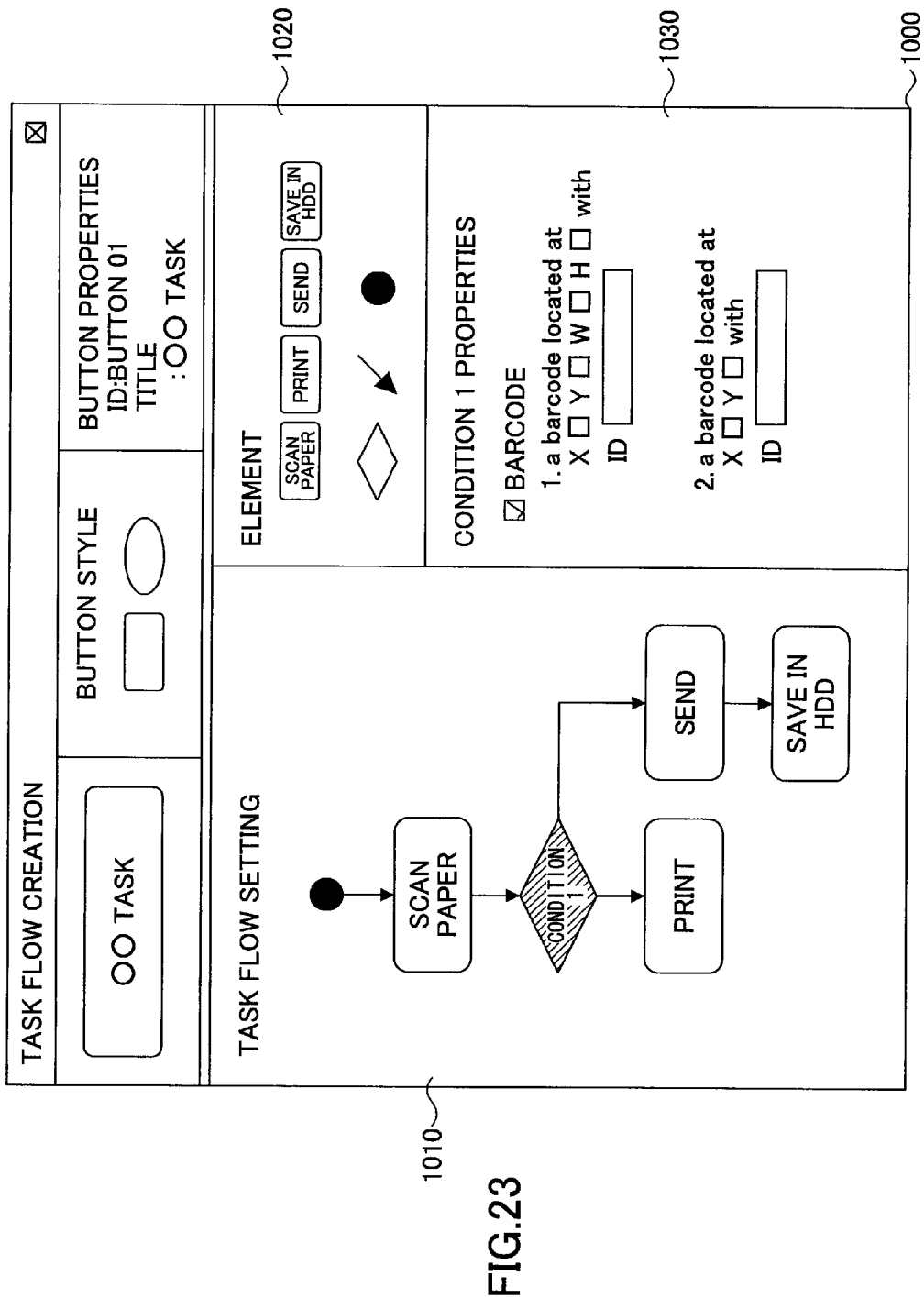
FIG. 23 is a conceptual diagram showing an example of a UI screen of a tool.
Figure 24:
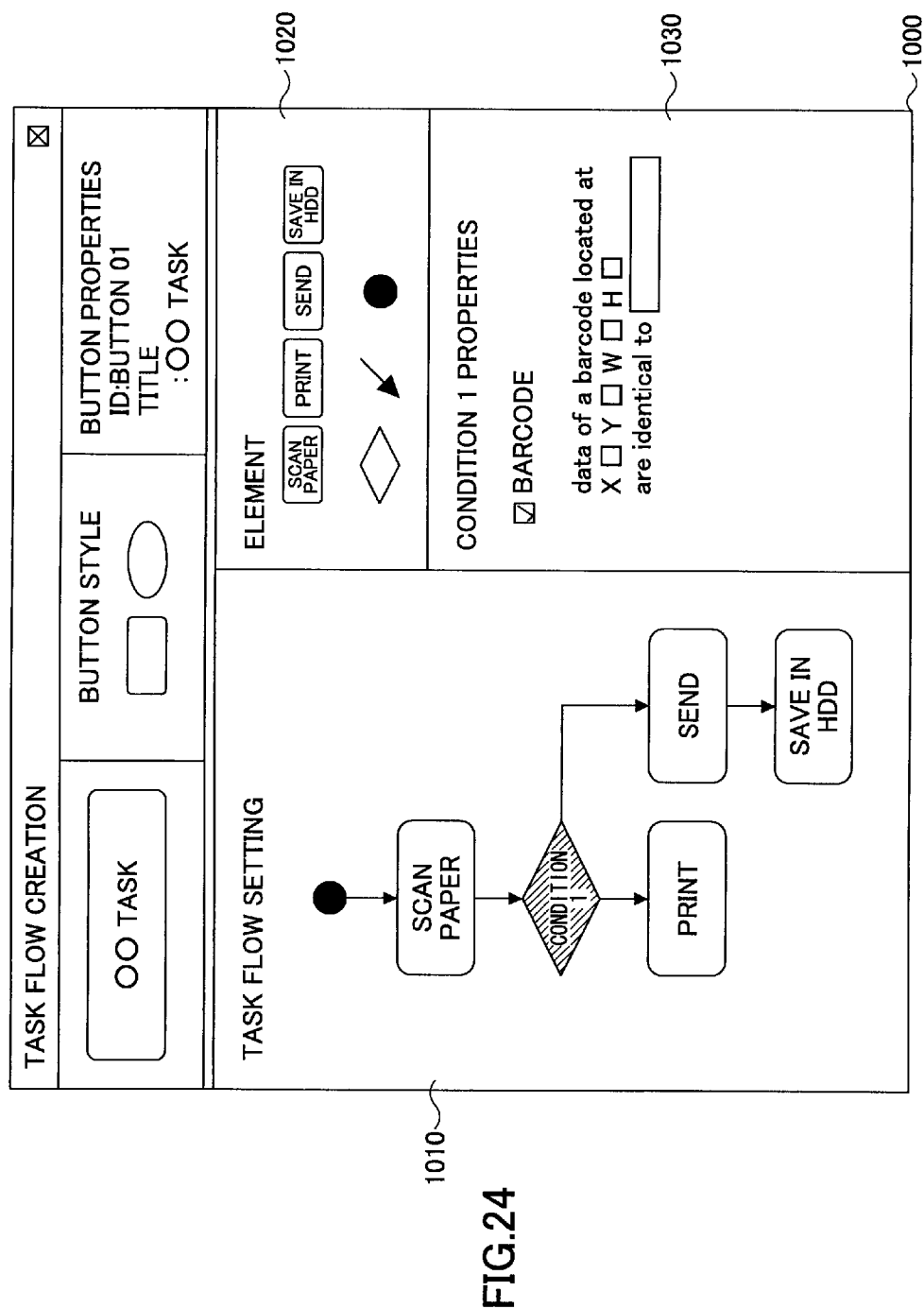
FIG. 24 is a conceptual diagram showing an example of a UI screen of a tool.

When the user presses the button 2010, a UI screen 1000 of FIG. 23 or a UI screen 1000 of FIG. 24 is displayed on the operations unit 111. Similar to the UI screen 1000 of FIG. 5, each of the UI screens 1000 of FIGS. 23 and 24 includes a task flow field 1010 for creating a task flow, an element field 1020 for selecting elements that visually represent operations executable by the multifunction machine 1 and conditions for switching a path among the operations, and a condition field 1030 for configuring the conditions for switching a path among the operations.

With use of the operations unit 111, the user sequentially selects the elements in the element field 1020 and creates a task flow with the selected elements in the task flow field 1010. Further, with use of the operations unit 111, the user selects an element "CONDITION 1" visually representing a condition for switching a path among the operations in the task flow field 1010 and configures the condition in the condition field 1030.

In the example of FIG. 23, the condition in the condition field 1030 is related to image features (e.g. barcode layout). More specifically, the condition in the condition field 1030 of FIG. 23 is to determine whether barcodes with the specified barcode IDs are located at predetermined positions.

In the example of FIG. 24, the condition in the condition field 1030 is related to information acquired from the image. More specifically, the condition in the condition field 1030 of FIG. 24 is to determine whether data of a barcode located at a specified position are identical to predetermined data.

Figure 25:
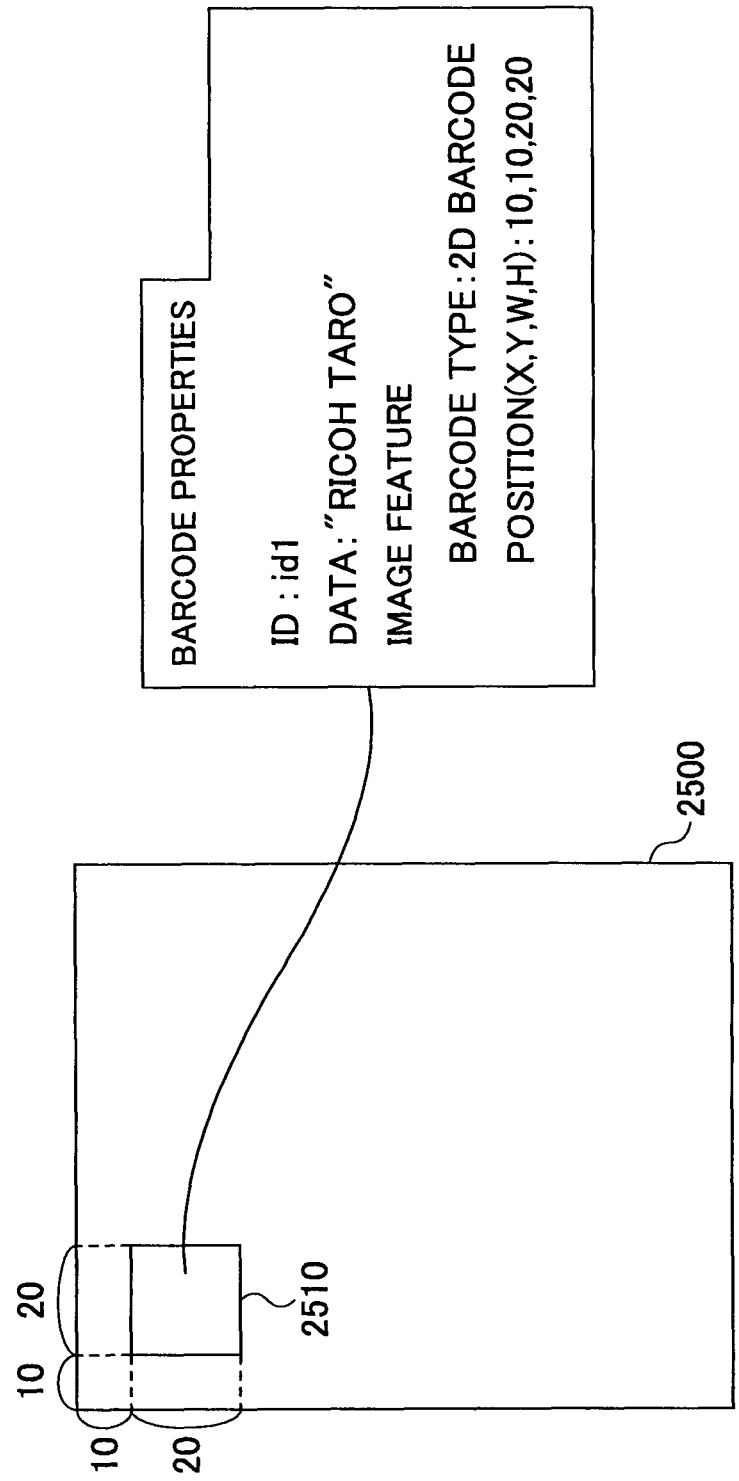
FIG. 25 is a conceptual diagram showing an example of features of an image scanned from a paper document and information acquired from the image.

FIG. 25 is a conceptual diagram showing an example of features of an image scanned from a paper document 2500 and information acquired from the image. A two-dimensional barcode 2510 is printed on the upper left side of the paper document 2500. The two-dimensional barcode 2510 contains an ID, data, and image features including a barcode type and a position.

In the case of the paper document 2500, for example, the condition may be for determining whether the two-dimensional barcode 2510 with the ID "id1" is located at the position (10, 10, 20, 20). As another example, in the case of the paper document 2500, the condition may be for determining whether data of the two-dimensional barcode 2510 located at the position (10, 10, 20, 20) are identical to "RICOH TARO".

The user can create a task flow as if creating a flowchart by using the UI screen 1000 of FIG. 23 or the UI screen 1000 of FIG. 24. Therefore, the user can easily create the task flow even without specialized programming knowledge.

When creation of the task flow is completed, the user instructs completion of the creation of the task flow through the operations unit 111. The operations unit 111 issues a task flow creation request to the task flow construction module 112. Based on the task flow created by the user by using the UI screen 1000, the task flow construction module 112 creates task flow data representing the task flow.

FIG. 26 is a configuration diagram showing an example of the task flow data. Task flow data shown in FIG. 26 are a part of a script created from a task flow in which a condition related to image features (layout, etc.) and information acquired from the image (barcode, etc.) are incorporated. Registration of the task flow data of FIG. 26 into the multifunction machine 1 enables the multifunction machine 1 to execute the task flow created by the user by using the UI screen 1000.

As in Embodiment 1, with use of the operations unit 111, the user registers the task flow into the specified multifunction machine 1. In this way, the multifunction machine 1 can implement the task flow corresponding to the registered task flow data. When the task flow is implemented, the UI screen 1100 for image processing that has been displayed on the operations unit 131 of the multifunction machine 1 is changed to a UI screen 1200 on which a "oo TASK" button 1201 for executing the implemented task flow is added.

As the task flow implementation system 100 of this embodiment of the present invention can create the task flow by combining the operations executable by the multifunction machine 1 and the conditions for switching a path among the operations, the multifunction machine 1 can readily and flexibly respond to various complex task flows of users.

(Execution of Implemented Task Flow)

Figure 27:
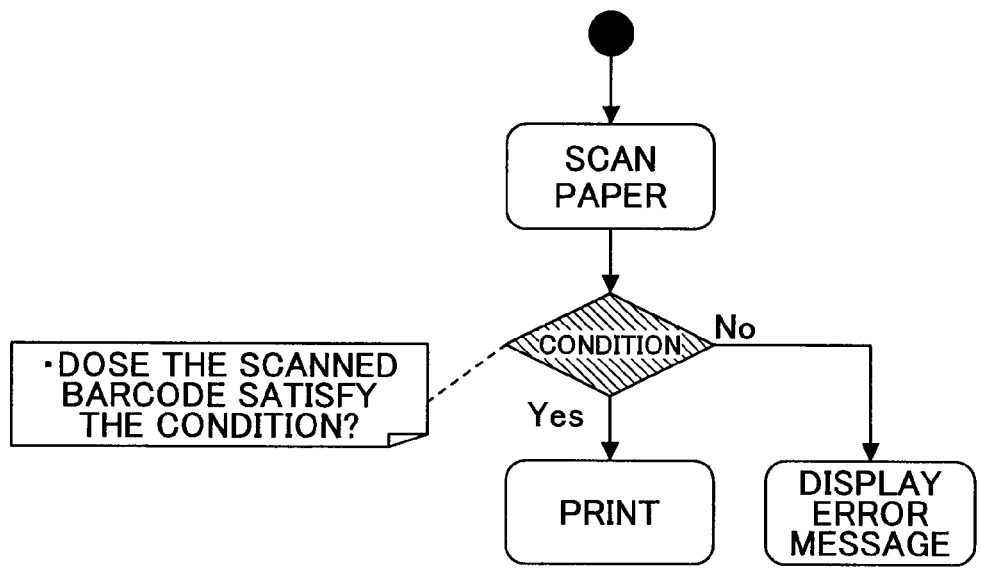
FIG. 27 is a diagram for explaining an example of a task flow implemented in a multifunction machine.

The multifunction machine 1 executes the implemented task flow as described below. In the following example, a task flow of FIG. 27 is implemented in the multifunction machine 1 of FIG. 3. FIG. 27 is a diagram for explaining the task flow implemented in the multifunction machine 1. The task flow shown in FIG. 27 is configured to change the behavior depending on a scanned barcode. For example, in the task flow of FIG. 27, a paper document is scanned. Then, a print operation or an operation of displaying an error message is executed depending on a determination whether a barcode printed on the scanned paper document satisfies a condition.

Figure 28:
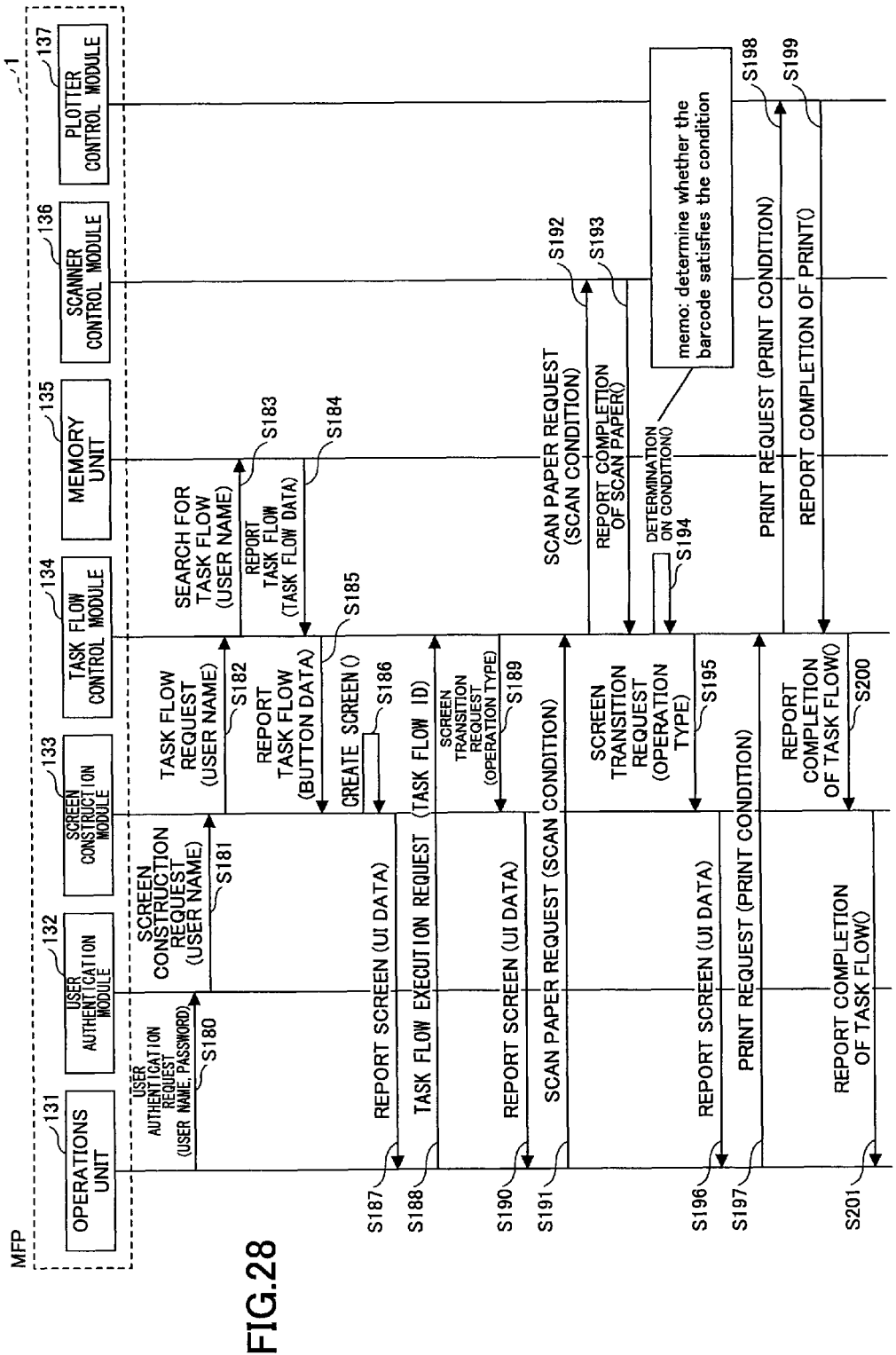
FIG. 28 is a sequence diagram showing an example of a processing procedure taken by a multifunction machine for executing a task flow.

In the case where the condition is satisfied in the task flow of FIG. 27, the multifunction machine 1 performs processing as shown in FIG. 28. FIG. 28 is a sequence diagram showing an example of a processing procedure where the multifunction machine 1 executes a task flow. It is to be noted that the sequence diagram of FIG. 28 is similar to the sequence diagram of FIG. 15 except for some differences and is not described in detail.

Processing in Steps S180 through S187 is similar to the processing in Steps S80 through S87 of FIG. 15 and is not described herein. In step S188, the user presses the "oo TASK" button 1201 with use of the operations unit 131. In Step S188, the operations unit 131 issues a task flow execution request to the task flow control module 134. The task flow execution request contains a task flow ID.

Upon reception of the task flow execution request, in Step S189 the task flow control module 134 specifies the type of an operation and issues a screen transition request to the screen construction module 133. In Step S190, the screen construction module 133 transmits UI data of a UI screen corresponding to the type of the operation (scan paper) to the operations unit 131. The operations unit 131 displays a UI screen for issuing a scan paper request based on the received UI data.

The user places a paper document on a scan area, and presses a button for starting scanning the paper document by operating the operations unit 131. In Step S191, the operations unit 131 transmits the scan paper request to the task flow control module 134. The scan paper request contains a scan condition.

In Step S192, the task flow control module 134 transmits the scan paper request to the scanner control module 136. The scan paper request contains the scan condition. Upon reception of the scan paper request, the scanner control module 136 scans the image of the paper document according to the scan condition. In Step S193, the scanner control module 136 sends a scan paper completion report to the task flow control module 134.

In Step S194, the task flow control module 134 determines whether a condition is satisfied. In the case of the task flow shown in FIG. 27, a print operation or an operation of displaying an error message is executed depending on a determination whether the condition is satisfied. As the sequence diagram of FIG. 28 shows the example in which the condition is satisfied, the task flow control module 134 determines that the condition is satisfied.

Then, in Step S195, the task flow control module 134 specifies the type of an operation (print) and issues a screen transition request to the screen construction module 133. In Step S196, the screen construction module 133 transmits UI data of a UI screen corresponding to the type of the operation (print) to the operations unit 131. The operations unit 131 displays a UI screen for issuing a print request based on the received UI data.

Processing in Steps S196 through S201 is similar to the processing in Steps S96 through S101 of FIG. 15 and is not described herein. The determination on the condition in Step S194 is described below in greater detail.

Figure 29:
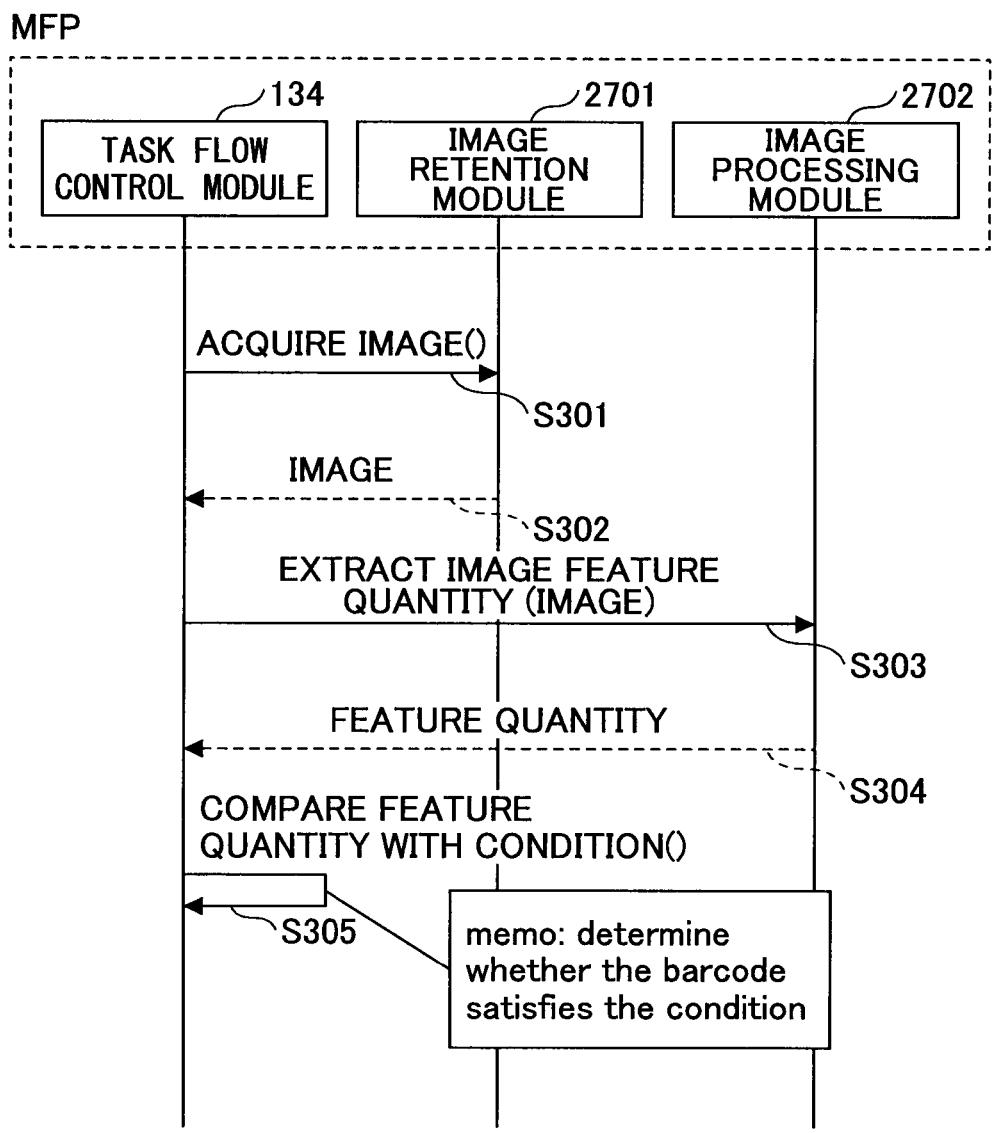
FIG. 29 is a sequence diagram showing an example of details of determination on a condition.

FIG. 29 is a sequence diagram showing an example of details of the determination on the condition. In Step S301, the task flow control module 134 sends an image acquisition request to an image retention module 2701. In Step S302, the task flow control module 134 acquires an image from the image retention module 2701.

In Step S303, the task flow control module 134 requests an image processing module 2702 to extract an image feature quantity. The image processing module 2702 extracts image features from the image. In this example, barcode properties are read from the barcode as image quantity. In Step S304, the image processing module 2702 sends the barcode properties as the image feature quantity to the task flow control module 134. In Step S305, the task flow control module 134 determines whether the image satisfies the condition by comparing the barcode properties as the image feature quantity to the condition.

In this manner, the multifunction machine (image processing apparatus) 1 of the present invention can easily execute the task flow created and implemented by the user.

The present invention is not limited to the specifically disclosed embodiments, but various variations and modifications may be made without departing from the scope of the present invention. The image feature quantity may include image data size, header information, the number of pixels, etc., other than barcode properties.

A flow implementing unit as set forth in the accompanying claims may start a flow corresponding to predetermined information if scanned image data contain the predetermine information and acquire a condition for switching a path among the operations included in the flow from the predetermined information.

The condition for switching a path among the operations may be related to image features (barcode layout, etc.) and information acquired from the image (barcode, etc.).

The present application is based on Japanese Priority Application No. 2006-071777 filed on Mar. 15, 2006, and Japanese Priority Application No. 2007-057887 filed on Mar. 7, 2007, with the Japanese Patent Office, the entire contents of which are hereby incorporated by reference.

What is claimed is:

1. A flow implementation system, comprising:
    a flow setting unit configured to set a flow by combining a plurality of operations to an image scanned by an image processing device; and
    a flow implementation indicating unit configured to indicate implementation of the flow set by the flow setting unit,
    wherein the flow setting unit combines an operation for recognizing a condition to switch the flow based on a code contained in the image scanned by the image processing device, with an operation for determining an operation to be implemented on the image based on the recognized condition.

2. The flow implementation system according to claim 1, wherein the flow setting unit includes,
    a condition setting unit configured to set a condition for switching the flow; and
    an element screen displaying unit configured to display a screen for selecting elements visually representing the plurality of operations and the condition for switching the flow.

3. The flow implementation system according to claim 2, wherein the condition for switching the flow includes at least one of date, day of the week, time, an event, a result of an implemented operation, an occurred error, an authorized user, and a status of another user.

4. The flow implementation system according to claim 2, wherein the condition for switching the flow includes presence or absence of the code included in a predetermined location of the image read by the image processing device.

5. The flow implementation system according to claim 2, wherein the code is one of a barcode and a two-dimensional barcode.

6. An image processing apparatus, comprising:
a flow setting unit configured to set a flow by combining a plurality of operations to an image scanned by the image processing apparatus; and
a flow implementation indicating unit configured to indicate implementation of the flow set by the flow setting unit,
wherein the flow setting unit combines an operation for recognizing a condition to switch the flow based on a code contained in the image scanned by the image processing apparatus, with an operation for determining an operation to be implemented on the image based on the recognized condition.

7. The image processing apparatus according to claim 6, wherein the flow setting unit includes,
a condition setting unit configured to set a condition for switching the flow; and
an element screen displaying unit configured to display a screen for selecting elements visually representing the plurality of operations and the condition for switching the flow.

8. The image processing apparatus according to claim 7, wherein the condition for switching the flow includes at least one of date, day of the week, time, an event, a result of an implemented operation, an occurred error, an authorized user, and a status of another user.

9. The image processing apparatus according to claim 7, wherein the condition for switching the flow includes presence or absence of a feature included in a predetermined location of the image read by the image processing apparatus.

10. The image processing apparatus according to claim 7, wherein the condition for switching the flow includes information identified from a feature included in the image read by the image processing apparatus.

11. An information processing apparatus, comprising:
a flow setting unit configured to set a flow by combining a plurality of operations to an image scanned by an image processing device; and
a flow implementation indicating unit configured to indicate implementation of the flow set by the flow setting unit,
wherein the flow setting unit combines an operation for recognizing a condition to switch the flow based on a code contained in the image scanned by the image processing device, with an operation for determining an operation to be implemented on the image based on the recognized condition.

12. The information processing apparatus according to claim 11, wherein the flow setting unit includes,
a condition setting unit configured to set a condition for switching the flow; and
an element screen displaying unit configured to display a screen for selecting elements visually representing the plurality of operations and the condition for switching the flow.

13. The information processing apparatus according to claim 12, wherein the condition for switching the flow includes at least one of date, day of the week, time, an event, a result of an implemented operation, an occurred error, an authorized user, and a status of another user.

14. The information processing apparatus according to claim 12, wherein the condition for switching the flow includes presence or absence of a feature included in a predetermined location of the image read by the image processing device.

15. The information processing apparatus according to claim 12, wherein the condition for switching the flow includes information identified from a feature included in the image read by the image processing device.

* * * * *